(12) United States Patent
Sato

(10) Patent No.: US 6,485,191 B1
(45) Date of Patent: Nov. 26, 2002

(54) FIBER STUB TYPE DEVICE AND AN OPTICAL MODULE USING THE SAME, AND A METHOD FOR PRODUCING A FIBER STUB TYPE DEVICE

(75) Inventor: Yasushi Sato, Kyotanabe (JP)

(73) Assignee: Kyocera Corporation, Kyoto (JP)

( * ) Notice: Subject to any disclaimer, the term of this patent is extended or adjusted under 35 U.S.C. 154(b) by 117 days.

(21) Appl. No.: 09/627,629

(22) Filed: Jul. 29, 2000

(30) Foreign Application Priority Data

Jul. 29, 1999 (JP) .......................... 11-215922
Oct. 29, 1999 (JP) .......................... 11-309814
Jan. 31, 2000 (JP) .......................... 2000-027387

(51) Int. Cl.[7] ................................. G02B 6/38
(52) U.S. Cl. ........................................ 385/73
(58) Field of Search .................. 439/60, 140, 70–73, 439/76–78, 58, 66, 96, 48, 50, 138, 495

(56) References Cited

U.S. PATENT DOCUMENTS 5,325,456 A   6/1994  Cullen et al.
6,448,102   *  4/2000  Fukusshima ............... 385/72
6,236,782 B1  *  5/2001  Kewitsch et al. .......... 385/43

OTHER PUBLICATIONS

"Numerical Analysis of Eigenmodes and Splice Losses of Thermally Diffused Expanded Core Fibers" by Yasuo Ohtera et al., Journal of Lightwave Technology, vol. 17, No. 12, Dec. 1999.

* cited by examiner

Primary Examiner—Neil Abrams
Assistant Examiner—J. F. Duverne
(74) Attorney, Agent, or Firm—Hogan & Hartson, LLP

(57) ABSTRACT

A fiber stub type optical device is provided with a ferrule formed with a through hole extending in a longitudinal direction thereof and a groove for dividing the through hole in an intermediate position with respect to the longitudinal direction, a first optical fiber accommodated in the through hole, a second optical fiber aligned with the first optical fiber in the through hole while being divided by the groove and having a larger mode field diameter than the first optical fiber, and an optoisolator provided in the groove and optically connected with the second optical fiber divided by the groove.

20 Claims, 18 Drawing Sheets

FIBER STUB TYPE DEVICE AND AN OPTICAL MODULE USING THE SAME, AND A METHOD FOR PRODUCING A FIBER STUB TYPE DEVICE

BACKGROUND OF THE INVENTION

This invention relates to an optical module suitably used in an optical communication apparatus, sensor or the like, and to a fiber stub type optical device mountable in an optical module and having a built-in optoisolator for blocking reflected and returned light from the outside, and to a method for producing a fiber stub type optical device.

In a semiconductor laser diode (hereinafter, "LD"), which is one of semiconductor devices, used as a light source in the optical communication, if emitted light is reflected and returned to an active layer of the LD, an oscillating state of the LD is disturbed. This causes a variation in emission power and a wavelength deviation, thereby deteriorating signals.

In order to prevent such a problem, the LD is normally mounted in the same package as an optoisolator for transmitting light only in one direction to thereby construct an LD module which is one type of the optical module.

Particularly, analog signals are likely to be deteriorated by the reflected and returned light, and the higher the density thereof, the more they are likely to be influenced by the reflected and returned light. Accordingly, optoisolators have become essential elements as analog transmission data via, e.g., CATV increases and requires larger capacity and higher speed.

The operation of a general optoisolator is described. The optoisolator is, as shown in FIGS. 26A and 26B, comprised of a Faraday rotator 19c and two polarizers 19a, 19b at the opposite sides of the Faraday rotator 19c. As shown in FIG. 26A, a forward propagating light 22 incident on the first polarizer 19a becomes a linearly polarized light of a specific polarization direction (see 23a in FIG. 26A). This forward propagating light 22 has its polarization direction 24 rotated by 45° to the right with respect to the propagating direction of the light in FIG. 26A by the Faraday rotator 19c, is then incident on the second polarizer 19b having the polarization direction 23b rotated by 45° to the right from the polarization direction 23a of the first polarizer 19a with respect to the propagating direction of the light, and emerges out of the optoisolator while maintaining its polarization direction.

On the other hand, as shown in FIG. 26B, backward propagating light 25 is made into a linearly polarized light by the second polarizer 19b, and has its polarization direction 24 rotated by 45° in the same direction as in FIG. 26A by the Faraday rotator 19c, with the result that this light is blocked by the first polarizer 19a by forming an angle of 90° with respect to the polarization direction 23a of the first polarizer 19a.

Next, an example of the conventional LD module is described. As shown in FIG. 27, an LD module J1 is constructed such that at least an LD 15, lenses 6a, 6b, an optoisolator 2, and one end of a single-mode fiber 4 are accommodated in a package 18. Identified by 16 in FIG. 27 is a light detector, by 17 a Peltier cooler and by 32 a rubber boot for protecting an optical fiber margin.

In this LD module J1, the light emitted from the LD 15 is collimated by the lens 6a, transmits through the optoisolator 2, and is gathered by the lens 6b to be incident on the single-mode fiber 4. The package is used to isolate the respective parts from external environments. Ball lenses, biconvex lenses, aspheric lenses, gradient-index lenses (hereinafter, "GRIN lenses") and the like are used as the lenses 6a, 6b.

Further, in order to miniaturize the entire module and facilitate an alignment, there has been proposed an optical device J2 which is a combination of an optical fiber and an optoisolator without using lenses as shown in FIG. 28 (see Japanese Unexamined Patent Publication No. 9-105886). In this optical device J2, a core enlarged fiber 4 obtained by enlarging a core diameter of an optical fiber is used, the elements (polarizers 19a, 19b, Faraday rotator 19c) of the optoisolator are separately arranged and while a specified element (Faraday rotator 19c) is arranged in a groove 7 formed obliquely to an optic axis in order to prevent reflection.

In order to miniaturize the entire optical module and facilitate an alignment, there has been also proposed an optical device J3 in which an optoisolator is mounted on a fiber stub similarly using a core enlarged fiber 5 without using lenses as shown in FIG. 29 (see Japanese Unexamined Patent Publication No. 10-68909).

This optical device J3 uses the core enlarged fiber 5 obtained by enlarging a core diameter of an optical fiber in order to improve optical coupling, and the optoisolator 2 is obliquely inserted with respect to an optic axis in order to prevent reflection. The optical device J3 is constructed by fitting an optoisolator 2 and a cylindrical magnet 30 surrounding the optoisolator 2 in a ferrule 3 holding a fiber 9 having a spherical end in its axial center and fixedly mounting an entire assembly in a sleeve 13.

The optical device J3 is free from radial displacement since the ferrule 3 is coaxially mounted with high precision. Further, the module provided with the optoisolator can be easily assembled by operation steps similar to those for a module having no optoisolator. However, in this prior art, how the ferrule 3 is processed, how the optoisolator 2 and the magnet 30 are assembled and fixed are unclear.

The core enlarged fiber used in the optical devices J2, J3 and the like is formed by locally heating a general single-mode fiber. Specifically, the single-mode fiber is heated to diffuse dopants such as germanium in the core, thereby enlarging a diffusion area of the dopants and making a specific refractive index difference smaller.

If a diameter of the core increases with the specific refractive index difference between the core of the optical fiber and the cladding thereof unchanged, a single-mode condition breaks and a multimode is excited. However, in the case of the core enlarged fiber, the enlargement of the core and a reduction of the specific refractive index difference simultaneously occur due to the diffusion of the dopants caused by heat and accordingly $r \times (D)^{1/2}$ is automatically maintained at constant value. Here, r denotes a radius of the core of the optical fiber, D a specific refractive index difference between the core and the cladding, and $r \times D^{1/2}$ an amount in proportion to normalized frequency. The single-mode condition is maintained if this value $r \times (D)^{1/2}$ is constant.

FIG. 30 shows optical coupling characteristics of the core enlarged fiber. A horizontal axis represents a fiber spacing which is a spacing between the divided sections of the core enlarged fiber (width of a groove formed in a core enlarged portion) and a vertical axis represents an optical coupling loss (diffraction loss). Here, w denotes a mode field diameter and corresponds to the respective curves. It is assumed that wavelength is 1.31 $\mu$m generally used in optical communication and the groove (clearance between fibers) is filled with air (refractive index n=1).

This graph shows that the larger the mode field diameter w, the smaller the diffraction loss. For example, in the case of the mode field diameter w of 10 μm (i.e., the core is not enlarged), when the fiber spacing is 70 μm, the diffraction loss is above 1 dB. Contrary to this, in the case of the mode field diameter w of 40 μm, even when the fiber spacing is 800 μm, the diffraction loss is below 1 dB. This clearly shows an improvement in coupling characteristic.

However, in the module as shown in FIG. 27, the optoisolator 2, the lenses 6a, 6b and other parts are aligned after being separately fixedly mounted in the holder. Thus, this module disadvantageously requires many parts and a cumbersome adjustment and results in a large size.

Although the core enlarged fibers are used in the examples shown in FIGS. 28 and 29, the conventional core enlarged fibers have following problems (a) to (g).

(a) Although having an advantage of an alleviated tolerance for radial displacement, the core enlarged fiber requires a tapered portion where the core diameter gradually increases. A large temperature difference is required to form the tapered portion and, thus, heating must be locally applied.

(b) Since the core enlarged portion is several mm, this heating needs to be applied to each device at least once. In the case of heating by an electric furnace, several to in the order of ten hours are needed. That the core enlarged fiber has to be formed by locally applying heating one by one for a long time is a biggest problem thereof.

(c) In the case that the grooves for inserting the optical devices are formed, loss is large since, if the tapered portion is located in the groove, this results in coupling of fibers having different mode field diameters.

(d) The length and angle of the tapered portion are determined by a temperature gradient which is difficult to control. Loss changes as the length and angle change.

(e) In the optical device J3 shown in FIG. 29, the core enlarged fiber 5 needs to have a tapered portion and a long core enlarged region. It is actually difficult to manufacture such a core enlarged fiber because the tapered portion which requires a sharp temperature gradient and the long core enlarged region which requires a uniform temperature are adjacent to each other. Specifically, it is very difficult to controllably form the core enlarged fiber having the tapered portion with the parallel core enlarged region of a desired length.

(f) In the optical device J3 shown in FIG. 29, the groove dividing the ferrule 3 as well as the core enlarged fiber 5 is formed to arrange the optoisolator 2. This has an advantage that the axis of the core enlarged fiber 5 is not displaced even after being divided. However, since the ferrule 3 is usually made of a ceramic such as alumina or zirconia having excellent wear resistance, strength and precision, its hardness and elasticity are considerably different from those of the core enlarged fiber 5. If a blade for cutting the ceramic is used, a cut face of the core enlarged fiber 5 is rough, which results in diffusion of light and, therefore, a larger loss.

(g) In the optical device J3 shown in FIG. 29, since the optoisolator 2 is obliquely arranged, even light slightly reflected is at an angle to the optic axis of the core enlarged fiber 5 and the optoisolator 2 is coupled to the core of the optical fiber to prevent transmission of light in backward direction. However, a part of the reflected light may be incident on the cladding and transmits therethrough in a direction toward the LD (cladding mode).

SUMMARY OF THE INVENTION

It is an object of the present invention to provide a fiber stub type optical device, an optical module provided with a fiber stub type optical device, and a method for producing a fiber stub type optical device which are respectively free from the problems residing in the prior art.

According to an aspect of the invention, a fiber stub type optical device comprises a ferrule formed with a through hole extending in a longitudinal direction thereof and a groove for dividing the through hole in an intermediate position with respect to the longitudinal direction; a first optical fiber accommodated in the through hole; a second optical fiber aligned with the first optical fiber in the through hole while being divided by the groove and having a larger mode field diameter than the first optical fiber; and an optoisolator provided in the groove and optically connected with the second optical fiber divided by the groove.

With this construction, the fiber stub type optical device can be assembled substantially alignment-free even if an optical element is inserted in a transmission path, and by a far simpler procedure for a shorter time than the prior art.

Another aspect of the invention is directed to an optical module, comprising a substrate; and a fiber stub type optical device provided on the substrate and comprising a ferrule formed with a through hole extending in a longitudinal direction thereof and a groove for dividing the through hole in an intermediate position with respect to the longitudinal direction; a first optical fiber accommodated in the through hole; a second optical fiber aligned with the first optical fiber in the through hole while being divided by the groove and having a larger mode field diameter than the first optical fiber; and an optoisolator provided in the groove and optically connected with sections of the second optical fiber divided by the groove.

With this construction, the optical module can be optically adjusted only by adjusting the positions of the fiber stub type optical device and an optical element such as a light emitter.

Thus, the optical module can be assembled by a far simpler procedure for a shorter time than the prior art.

Still another aspect of the invention is directed to a method for manufacturing a fiber stub type optical device, comprising the steps of preparing a ferrule formed with a through hole extending in a longitudinal direction thereof; aligning a first optical fiber and a second optical fiber having a larger mode field diameter than the first optical fiber in the through hole; forming a groove in an intermediate position of the ferrule so as to divide the second optical fiber accommodate in the through hole and cross the through hole; and providing an optoisolator in the groove so as to be optically connected with sections of the second optical fiber divided by the groove.

Further aspect of the invention is directed to a method for manufacturing a fiber stub type optical device, comprising the steps of preparing a ferrule formed with a through hole extending in a longitudinal direction thereof; forming a groove in an intermediate position of the ferrule; aligning a first optical fiber and a second optical fiber having a larger mode field diameter than the first optical fiber in the through hole, such that the second optical fiber extends over the groove; dividing the second optical fiber accommodated to extend over the groove; and providing an optoisolator between sections of the second optical fiber divided by the groove.

According to the above methods, the fiber stub type optical device can be assembled substantially alignment-free even if an optical element is inserted in a transmission path, and by a far simpler procedure for a shorter time than the prior art.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
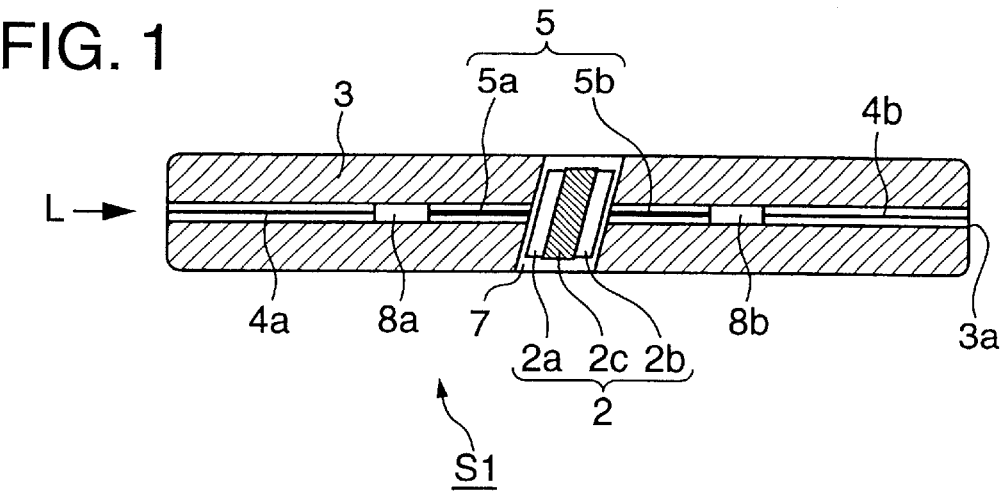
FIG. 1 is a sectional view diagrammatically showing a fiber stub type optical device according to a first embodiment of the invention.

FIG. 1 is a sectional view diagrammatically showing a fiber stub type optical device according to a first embodiment of the invention. As shown in FIG. 1, a fiber stub type optical device S is constructed such that a plurality of optical fibers 4a, 4b, 5, 8a, 8b having different mode field diameters are accommodated in series in a ferrule 3, a groove 7 for dividing the optical fiber 5 having a maximum mode field diameter of the plurality of optical fibers into two optical fibers 5a, 5b is formed in the ferrule 3, and an optoisolator 2 is arranged in the groove 7.

For example, first, a usual single-mode fiber 4a having a core diameter of 8 $\mu$m (beam diameter is about 10 $\mu$m, i.e., the mode field diameter of 10 $\mu$m), a gradient index (GI) fiber 8a having a lens function, a core enlarged fiber 5 having a core diameter of 40 $\mu$m, a GI fiber 8b having a lens function and a single-mode fiber 4b similar to the single-mode fiber 4a are successively inserted and fixed in a through hole 3a formed in the ferrule 3.

Subsequently, the ferrule 3 is cut in such a manner as to cross the center of the core enlarged fiber (to be divided into 5a, 5b later) having the maximum mode field diameter, thereby forming the groove 7 which is oblique to the longitudinal axis of the ferrule 3. End faces of the thus obtained core enlarged fibers 5a, 5b are exposed at the groove 7.

Then, the optoisolator 2 formed by integrally assembling polarizers 2a, 2b and a Faraday rotator 2c is placed in the groove 7. The Faraday rotator 2c generally requires a magnet or like means for applying a magnetic field. Here, a magnetic field applying means is not shown. It should be noted that some do not require any magnetic field applying means by having a property of spontaneous magnetization.

In this construction, light L incident on an end of the single-mode fiber 4a transmitted along the single-mode fiber 4a has its beam diameter enlarged from 10 μm to 40 μm by the GI fiber 8a and is incident on the core enlarged fiber 5a. After transmitting through the optoisolator 2 in the groove 7, this light propagates along the core enlarged fiber 5b, has its beam diameter converged to 10 μm by the GI fiber 8b, and then propagates along the single-mode fiber 4b.

Advantages of the fiber stub type optical device S1 thus constructed are described below.

First, the core enlarged fiber 5 used in the embodiment can be mass-produced since they require no tapered portion. Further, since the mode field is stabilized while the light is propagating along the single-mode fibers 4a, 4b, the light emerging from the single-mode fibers always has constant beam diameter and shape. Accordingly, if the light L is incident from left side of FIG. 1, a coupling state between the core enlarged fiber 5b, the GI fiber 8b and the single-mode fiber 4b does not change even if the groove 7 is formed in the intermediate position. Further, even if a state of the light L incident on the single-mode fiber 4a changes, a coupling state between the signal mode fiber 4a, the GI fiber 8a and the core enlarged fiber 5a and a coupling state between the core enlarged fiber 5b, the GI fiber 8b and the single-mode fiber 4b do not change at all.

Figure 27:
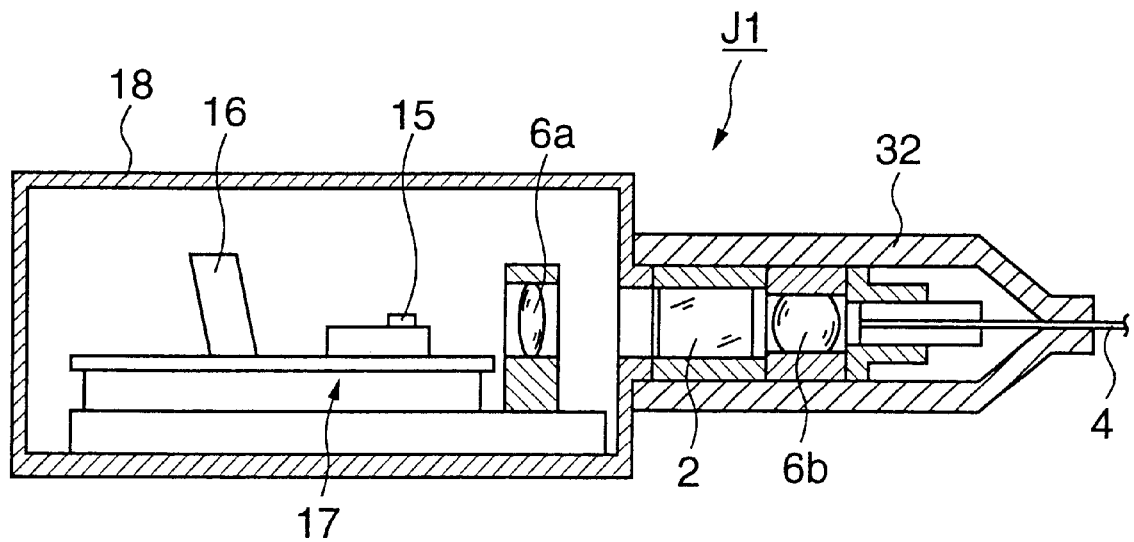
FIG. 27 is a sectional view showing a construction of a conventional optical module.
Figure 28:
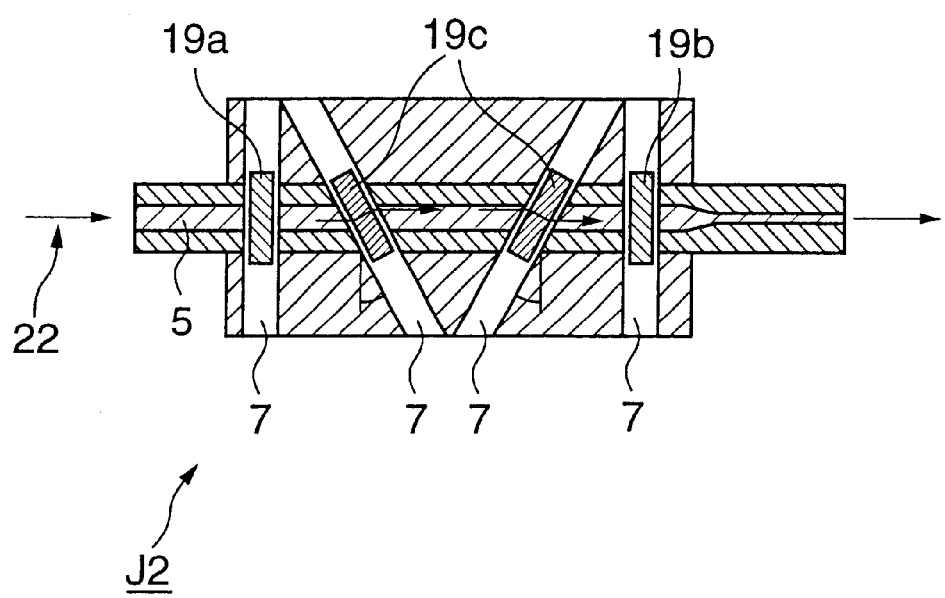
FIG. 28 is a sectional view showing a device in which an optoisolator is mounted in a conventional core enlarged fiber.
Figure 29:
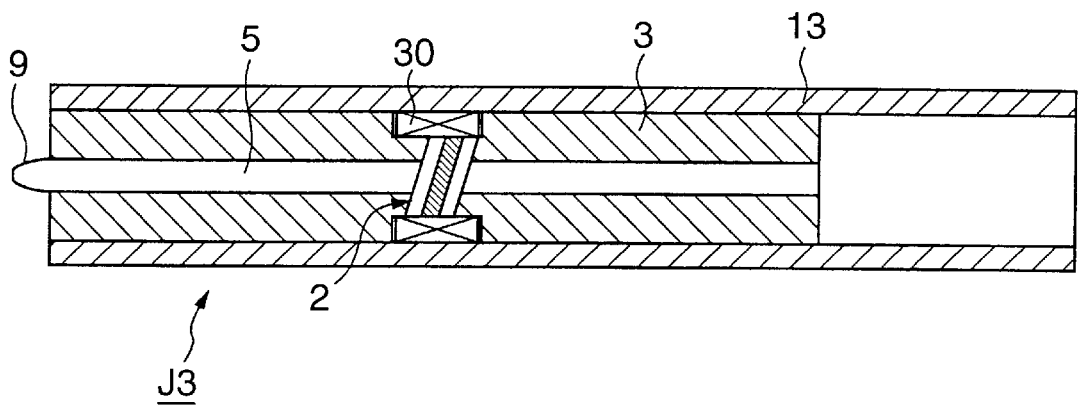
FIG. 29 is a sectional view showing a device in which an optoisolator is mounted in a conventional fiber stub.

Specifically, in the case of the conventional optical system shown in FIG. 27, a displacement of the lens 6a results in not only a change in the beam diameter, divergent angle, etc. of the light incident on the optoisolator 2, but also a change in a focusing position and a beam diameter at a focus (beam waist position) of the light after passing through the lens 6b. As a result, the coupling states become absolutely different. Contrary to this, the above excellent advantages can be obtained if the section in which the optoisolator 2 is inserted and the sections where the light is incident and emerges are single mode as in the present invention.

Figure 30:
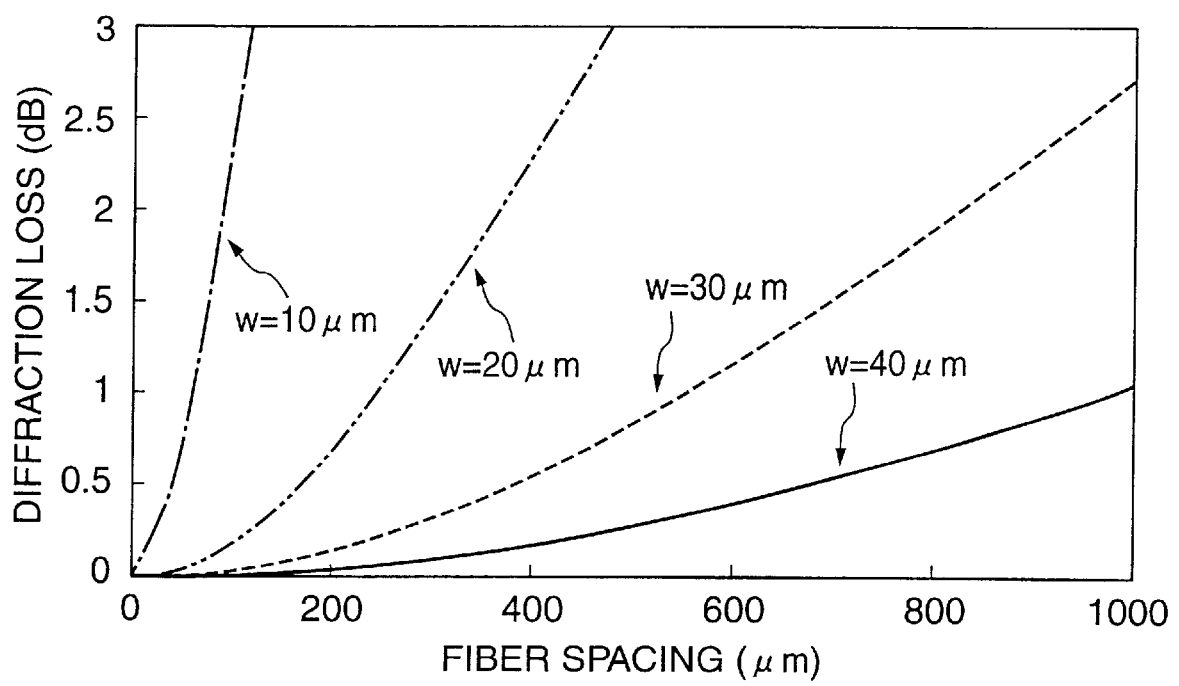
FIG. 30 is a graph showing a relationship between an spacing between divided sections of a core enlarged fiber and diffraction loss.

The case of single-mode fiber 4a, 4b having its core not enlarged corresponds to w=10 mm as shown in FIG. 30. In this case, the loss exceeds 1 dB already when a fiber spacing between the divided sections of the core enlarged fiber is 70 μm. When w=40 μm, the loss is 0.78 dB (below 1 dB) even at the spacing of 850 μm. If the optoisolator is inserted into the groove, the width of the groove needs to be about 800 to 850 μm since the thickness of the optoisolator is about 700 μm. However, even in such a case, sufficient coupling characteristics can be obtained.

The inventive fiber stub type optical device S1 thus constructed is substantially free from alignment even if an optical device is inserted in an intermediate position of a transmission path. Although the core enlarged fiber is used in this device S1, the device S1 can be produced by a far simpler procedure for a shorter time than the conventional one. Further, an optical module having a small size and excellent characteristics can be constructed by arranging the fiber stub type optical device S1 and a light emitting or detecting element optically coupled to the device S1 on a substrate.

EXAMPLE 1

Hereafter, a more specific example of the fiber stub type optical device according to the first embodiment is described.

Figure 2A:
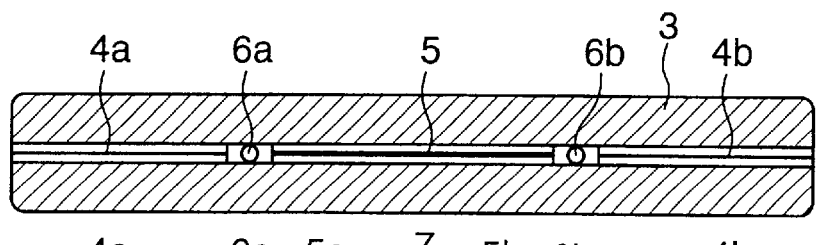
FIGS. 2A, 2B and 2C are sectional views diagrammatically showing a production process of the fiber stub type optical device according to the first embodiment.
Figure 2B:
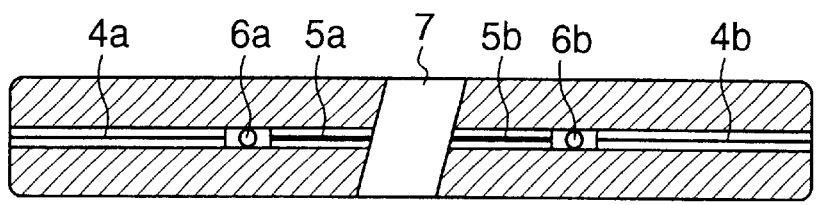
Figure 2C:
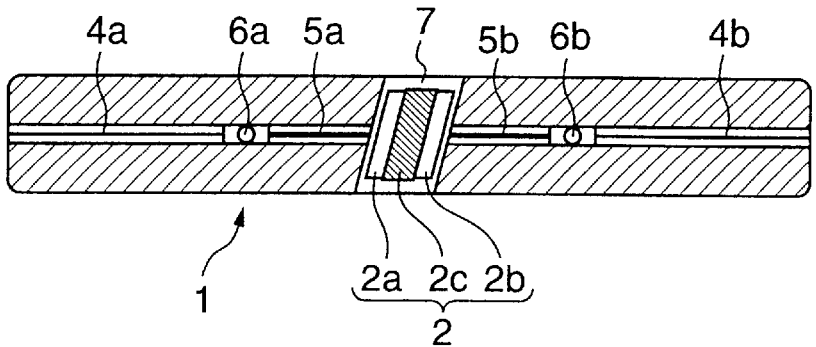

Reference is made to FIGS. 2A, 2B and 2C. The single-mode fiber 4a having a length of 2.5 mm and a mode field diameter of 10 μm, the ball lens 6a made of optical glass and having a diameter of 125 μm and a refractive index of 1.5, the core enlarged fiber 5 having a length of 6 mm and a mode field diameter of 40 μm, the ball lens 6b (corresponding to the GI fiber 8b of FIG. 1) and the single-mode fiber 4b are successively inserted and fixed in the zirconia ferrule 3 having a length of 12 mm and a diameter of 1.25 mm.

Although stainless spacers are inserted to adjust a spacing between the single-mode fibers 4a and the ball lens 6a and a spacing between the ball lens 6b and the single-mode fiber 4b to 117 μm, they are not shown. Although stainless spacers are inserted to adjust a spacing between the ball lens 6a and the core enlarged fiber 5 and a spacing between the core enlarged fiber 5 and the ball lens 6b to 467 μm, they are not shown, either.

In this way, the mode field diameters are converted at a ratio of 1:4 so as to highly efficiently couple the single-mode fibers 4a, 4b and the core enlarged fibers 5. Although the single-mode fibers 4a, 4b project from the end face of the ferrule 3 by in the order of 100 μm, the end faces thereof are abraded.

The groove 7 having a width of 800 μm is formed substantially in the middle of the fiber stub thus constructed by a dicing saw. At this time, the end faces of the core enlarged fibers 5a, 5b obtained by dividing the core enlarged fiber 5 are also exposed in the groove 7. The optoisolator 2 formed by integrally assembling polarizers 2a, 2b and the Faraday rotator 2c is inserted into the groove 7, and fixed by an epoxy thermosetting adhesive.

This optoisolator is comprised of the polarizers 2a, 2b (thickness: 200 μm, refractive index: 1.5) and the Faraday rotator 2c (magnetic garnet, thickness: 300 μm, refractive index: 2.2). After reflection preventing films are formed on the respective elements 2a, 2b and 2c, they are joined together by a transparent epoxy adhesive. The optoisolator 2 is a large square device having a side of 10 mm or larger. After being aligned at once and adhered, the optoisolator 2 is cut into smaller square pieces having a side of 400 μm and a thickness of 700 μm. As mentioned above, the magnetic field applying means is not shown.

Figure 3:
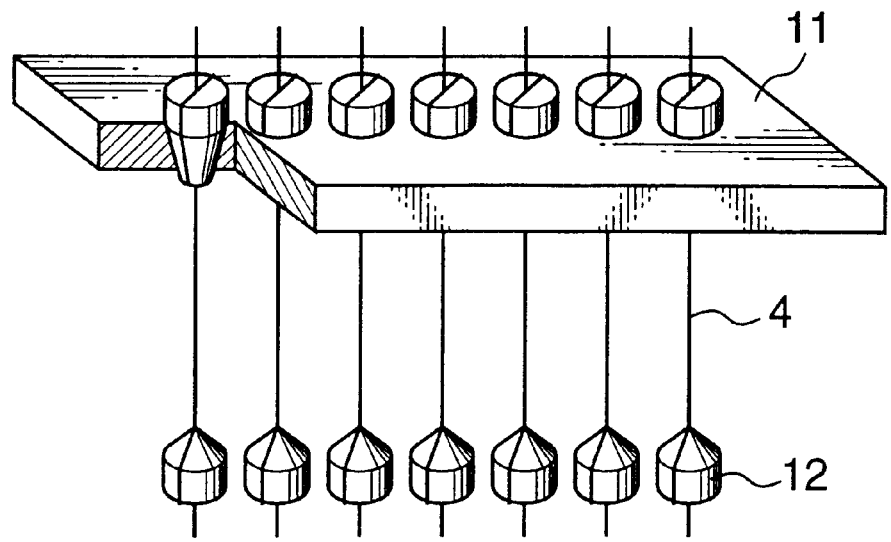
FIG. 3 is a perspective view partially in section showing a production method of the fiber stub type optical device according to the first embodiment.

Next, a core enlarged fiber production method is described with reference to FIG. 3. First, the single-mode fibers 4 cut to a length of 15 cm and having its resin coating stripped are fixed by a heat resistant jig 11 (made of ceramic). The length of the single-mode fibers 4 is restricted for the following reason. Since the resin coatings are stripped, the fibers 4 are likely to be broken when being too long. Further, weights 12 of about 5 grams (g) are provided to prevent the single-mode fibers 4 from being warped during heating. By being fixed by such a jig 11, several 100s of single-mode fibers 4 can be put into a heating furnace at once and heated at 130° C. for 10 hours to enlarge the core diameter to 40 μm. This method is highly efficient since many operation steps can be performed at once although a treatment time is long.

Also, such a core enlarged fiber may be made by spinning base material having a low specific refraction and a large core in a similar way to the production of usual optical fiber.

Figure 4A:
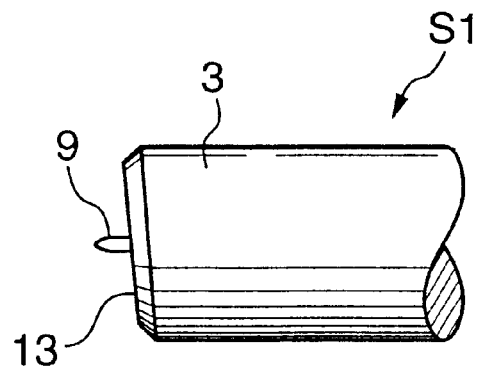
FIGS. 4A and 4B are side views showing examples of abrasion of an end of the fiber stub type optical device according to the first embodiment.
Figure 4B:
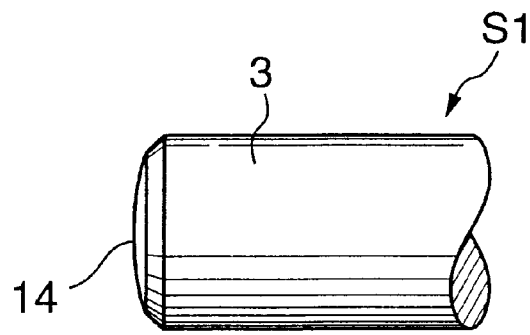

In order to prevent the reflection of the end face of the inventive fiber stub type optical device, an abraded surface 13 may be formed by oblique abrasion on the end face of the device S1 facing the LD when being mounted in the LD module as shown in FIG. 4A or an spherical abraded surface 14 may be formed by spherical abrasion (generally PC abrasion) thereon as shown in FIG. 4B. Further, a leading sphere 9 may be formed by processing the leading end of the fiber to have a spherical shape as shown in FIG. 4A in order to simultaneously prevent reflection and improve a coupling efficiency.

Instead of the ball lenses 6a, 6b, GI fibers, aspheric lenses or the like may be used for joining the single-mode fibers 4a, 4b and the core enlarged fibers together 5a, 5b.

Figure 5A:
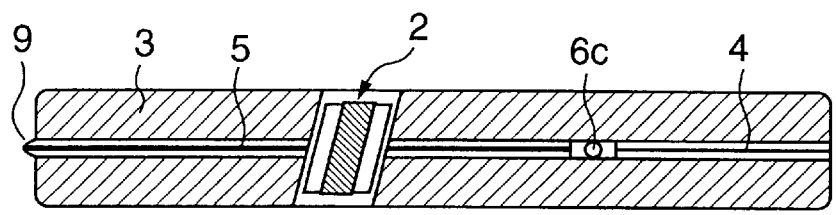
FIGS. 5A, 5B and 5C are sectional views showing modifications of the fiber stub type optical device according to the first embodiment.
Figure 5B:
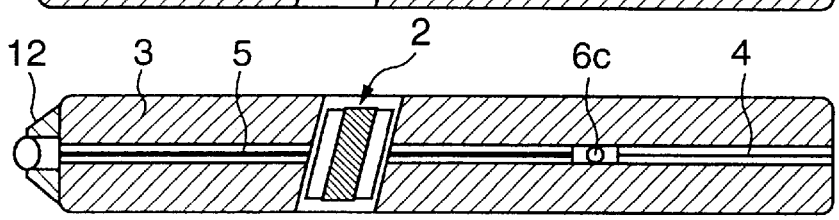

Instead of the construction in which the core enlarged fibers 5a, 5b are located between the single-mode fibers 4a, 4b, the single-mode fiber at the incident side may be deleted as shown in FIGS. 5A and 5B. In the constructions shown in FIGS. 5A and 5B, the coupling efficiency of the light from the LD (not shown) is better. For instance, a single-mode fiber 4 for transmission having a mode field diameter of 10 µm, a ball lens 6c, the core enlarged fiber 5 having a mode field diameter of 40 µm are inserted into the ferrule 3 as shown in FIG. 5A, and the single-mode fiber 4 and the core enlarged fiber 5 are highly efficiently coupled by converting the mode field diameter at a ratio of 1:4 by means of the ball lens 6c.

The groove 7 having a width of 800 µm is formed substantially in the middle of the fiber stub thus constructed by a dicing saw, and the optoisolator 2 is inserted into the groove 7 and fixed by an epoxy thermosetting adhesive. The leading end of the core enlarged fiber 5 is processed into a spherical shape to form the leading sphere 9. As a result, the incident end face has a lens effect and can be efficiently coupled to the LD as it is.

Further, as shown in FIG. 5B, a lens 6d for coupling the core enlarged fiber may be provided at the leading end of the ferrule 3 toward the LD by being fixed by a lens holder 15. The construction other than fixing of the lens 6d by the lens holder 15 is the same as that of FIG. 5A. In this case, efficiency is further improved since the lens 6d optimal for coupling the LD (not shown) and the core enlarged fiber 5 can be selected.

Figure 5C:
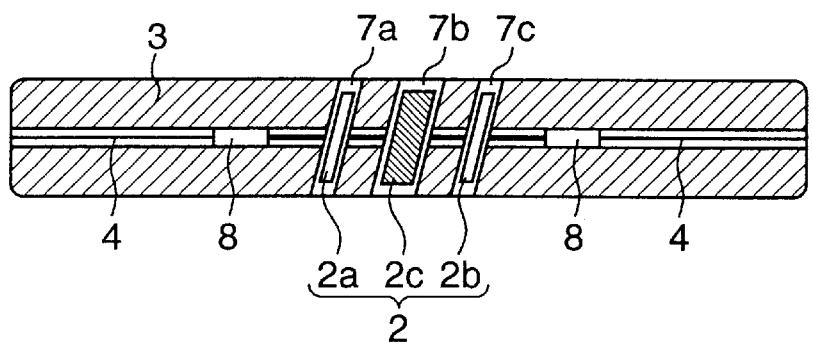

In the case that the optical device forming the optoisolator 2 can be divided, a diffraction loss is reduced to realize excellent characteristics. For example, as shown in FIG. 5C, the optoisolator 2 is divided into three optical devices: the polarizers 2a, 2b and the Faraday rotator 2c which construct the optoisolator 2. Specifically, the grooves 7a, 7c having a width of 250 µm are formed for the polarizers 2a, 2b having a thickness of about 200 µm, and the groove 7b having a width of 350 µm is formed for the Faraday rotator 2c having a width of 300 µm. The polarizers 2a, 2b are fixed in the grooves 7a, 7c and the Faraday rotator 2c is fixed in the corresponding groove 7b.

In the case of the constructions as shown in FIGS. 5A and 5B, the thickness of the optoisolator 2 is 70 µm and the width of the groove is 800 µm. From FIG. 30, it can be understood that the loss is about 0.67 dB when the mode field diameter is 40 µm and the fiber spacing is 800 µm. On the other hand, in the case that the separate optical elements are arranged in the corresponding grooves having widths of 250 µm and 350 µm as shown in FIG. 5C, the respective losses are 0.07 dB and 0.14 dB, a total of 0.28 dB when the core diameter is 40 µm. In this case, despite the fact that a total of the widths of the three grooves is 850 µm which is longer than the groove width 800 µm when the optical elements are not divided, a total of losses is smaller. This is also clear from FIG. 30. Specifically, if the graph is linear, the loss is same if the total of the groove widths is same regardless of the number of the grooves (including the single groove). However, a graph which substantially exponentially increase as in FIG. 30 shows that the loss is larger in the case of the single groove even if a total of widths of a plurality of grooves and the width of the single groove are the same.

Figure 6A:
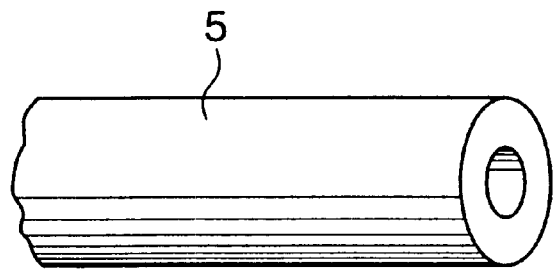
FIGS. 6A, 6B and 6C are perspective views showing an optical fiber for explanation of production of an optical fiber polarizer as a modification of the first embodiment.
Figure 6B:
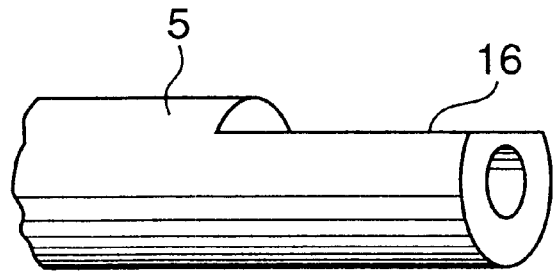
Figure 6C:
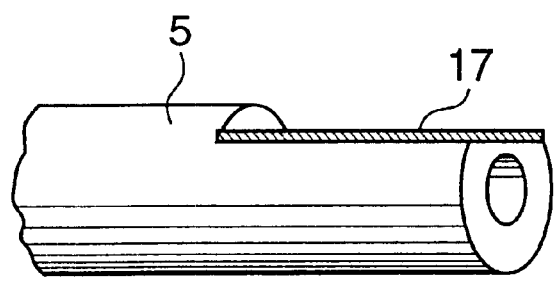

The core enlarged fiber 5 in the fiber stub may have a polarizer function. This case is described with reference to FIGS. 6A, 6B and 6C. A portion of the outer periphery of the optical fiber 5 shown in FIG. 6A is abraded until a distance between this portion and the core (core diameter: about 40 µm) of the fiber is 3 µm to form an abraded surface 16 as shown in FIG. 6B. A metal thin film 17 of aluminum having a thickness of 12 nm is formed by deposition on the abraded surface 16 as shown in FIG. 6C. It should be noted that vacuum deposition, spattering, or any suitable deposition method may be used here. In this way, a polarizer having a loss of 0.3 dB or less and an optical quenching ratio of 35 dB or above can be formed.

Two of such fiber type polarizers thus constructed are inserted from the opposite ends of the ferrule such that they abut against each other in the middle and fixed there. At this time, the two polarizers are rotated such that their planes of polarization (the same as the deposition surfaces) are 45° to each other. Thereafter, a 1.7 mm long groove inclined at 6° with respect to a plane normal to the longitudinal axis of the ferrule is formed by a dicing saw in the same manner as above, and only the Faraday rotator is inserted and fixed in the groove by being held by the ball lens having a diameter of 600 µm. The Faraday rotator is fixed while being inclined at about 10°. The number of parts necessary to construct the fiber stub type optical device can be reduced since the fiber is caused to have a function of the polarizer. Further, the groove can be narrowed because no polarizer is used, thereby increasing coupling efficiency. As a result, the insertion loss of the entire optoisolator can be reduced.

The single-mode fibers 4 shown in FIGS. 5A to 5C are for transmission, and they may not only be present in the through hole 3a of the ferrule 3 as shown, but also be an elongated piece drawn outside from the end face of the ferrule 3. This also applies for single-mode fibers corresponding to those shown in FIGS. 5A to 5C in fiber stub type optical devices of other constructions to be described later.

EXAMPLE 2

Figure 7:
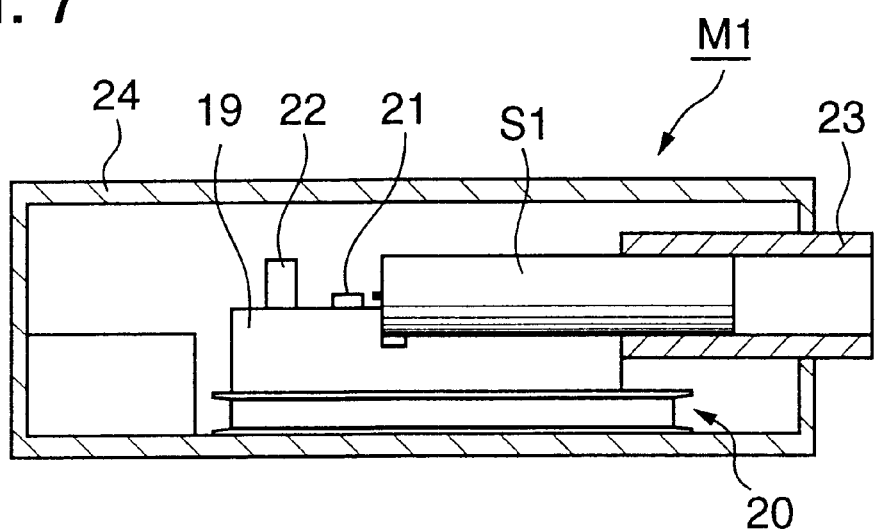
FIG. 7 is a sectional view diagrammatically showing an optical module according to the first embodiment of the invention.

AN LD module M1 which is one example of optical modules using the fiber stub type optical device S1 formed in Example 1 is shown in FIG. 7. In the optical module (LD module) M1, the fiber stub type optical device S1 having a spherical fiber end at the LD side is fixed in a V-shaped groove of a silicon (Si) platform 19. AN LD 21 stably operates while being held at a constant temperature by mounting the Si platform 19 on a Peltier cooler 20. A light detector 22 monitors light emitted from the LD 21 in order to stabilize a luminous intensity. A sleeve 23 is externally fitted to a connector (not shown) for optically coupling it with the fiber stub type optical device S1. The entire module M is hermetically sealed in a package 24.

In the optical module M1 thus constructed, all the optical adjustments of the optical module are completed only by aligning the LD 21 and the spherical end fiber. Since the entire optical system is accommodated in the ferrule 3, the LD module which is not only small in size, but also extremely stable so that it changes with time to a very small degree, can be provided.

Although the LD module is described as the optical module M1 in the above Example, the inventive optical module M1 is not restricted thereto and may, of course, be such that only a light emitter is provided as a semiconductor device on a substrate without providing a light detector or such that only a light detector is provided as a semiconductor device on a substrate without providing a light emitter.

The thus constructed fiber stub type optical device S1 and optical module M1 according to the first embodiment have following remarkable effects.

(a) Even if the position of the fiber stub type optical device and that of the semiconductor device such as an LD are displaced from each other, a state of optical coupling in the fiber stub does not change. Further, the optical adjustment of the optical module can be made only by adjusting the position of the semiconductor device such as an LD and that of the fiber stub type optical device and, accordingly, the optical module can be easily assembled.

(b) Since the optical device is constructed in a very small space inside the ferrule, an effective diameter of the optoisolator can be smaller. This leads to an excellent material efficiency, enabling more inexpensive production. Further, since the entire optical device is integrated in small size, reliability is high.

(c) The fiber stub type optical device itself can be easily formed by adjusting only a connecting portion of the single-mode fiber and the core enlarged fiber and by then inserting the optoisolator (or element constructing it) substantially without any alignment. Further, only the optical coupling system can be assembled before the element is inserted, which enables operation steps to be considerably reduced.

(d) If the fiber type polarizers are used, the number of parts can be reduced, the groove for the optoisolator can be narrowed, i.e., a construction having a good coupling efficiency can be realized.

(e) Although the core enlarged fiber is used, no tapered portion is required. Accordingly, a strict control of a temperature gradient is not necessary when the core enlarged fibers are fabricated, and the core enlarged fibers can be mass-produced.

(f) Similarly, since the tapered portion of the core enlarged fiber is not required, it is not necessary to consider a variation of each part which is a parameter giving a large influence on characteristics such as the length of the tapered portion and a taper angle.

(g) An excellent optical module which is small in size, easy to fabricate and inexpensive, and changes with time to a small degree can be constructed.

Figure 8A:
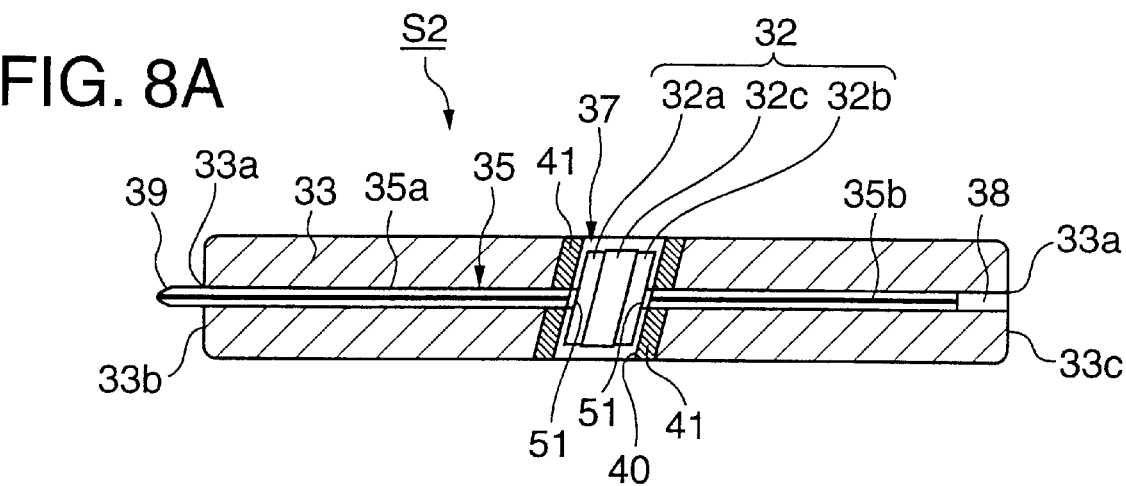
FIGS. 8A and 8B are sectional views diagrammatically showing a fiber stub type optical device according to a second embodiment of the invention.

FIG. 8A is a sectional view showing a fiber stub type optical device according to a second embodiment of the invention. As shown in FIG. 8A, a fiber stub type optical device S2 is constructed such that a core enlarged fiber 35 (35a, 35b) which is an optical fiber whose mode field diameter is enlarged to, e.g., 40 $\mu$m or larger, and a GI fiber 38 having a mode field diameter (e.g., about 10 $\mu$m) smaller than that of the core enlarged fiber 35 and adapted to convert the mode field diameter for optical connection with a single mode fiber (not shown) for transmission to the outside are accommodated in a ferrule 33. The GI fiber 38 is accommodated at one end of the ferrule 33.

Here, the core enlarged fibers 35a, 35b are arranged in two through holes (through paths) 33a at the opposite side of a groove 37. One end of each core enlarged fiber 35a, 35b projects into the groove 37. The side (circumferential) surfaces of the ends of the core enlarged fibers 35a, 35b projecting into the groove 37 are covered by protection members 41 having a higher refractive index than a cladding of the core enlarged fiber, so that these ends of the core enlarged fibers 35a, 35b can be optically connected via an optoisolator 32 provided in the groove 37.

The mode field diameter of the optical fibers are enlarged to 40 $\mu$m or larger as described above for the following reason. Assuming the use of an optoisolator which is thinnest among optical devices to be inserted into the groove between the optical fibers, the width of the groove needs to be at least 800 $\mu$m. In order to join the optical fibers with a loss of less than 1 dB, the mode field diameter needs to be 40 $\mu$m or larger.

The core enlarged fiber 35b which is a single mode fiber and the GI fiber 38 for converting the mode field diameter are connected in series in at least one of the through holes 33a accommodating the core enlarged fibers 35a, 35b.

The core enlarged fiber 35 is arranged in the ferrule 3, for example, in the following procedure. Specifically, before the core enlarged fiber 35 is inserted, the groove 37 crossing the through hole 33a are formed, and the single core enlarged fiber 35 is inserted and fixed in the left and right through holes 33a while being also located in the groove 37. After an exposed section (fiber side surface) of the core enlarged fiber 35 in the groove 37 is covered by the projection member 41 having a larger refractive index than the cladding of the core enlarged fiber 35, the core enlarged fiber 35 is divided into the core enlarged fibers 35a, 35b at the groove 37 so that the protection members 41 are provided at the respective ends of the core enlarged fibers 35a, 35b. The optoisolator 32 is arranged in a groove 40 formed in the groove 37 by dividing the core enlarged fiber 35.

Specifically, the groove 37 having a width of about 1.5 mm is formed in the middle of the ferrule 33 having, for example, a diameter of about 1.25 mm and a length of about 12 mm such that it crosses the through hole 33a at an angle of 2° with respect to the leading end face (i.e., plane normal to the longitudinal axis) 33b of the ferrule 33.

The core enlarged fiber 35 having an unchanging mode field diameter of about 40 $\mu$m and the GI fiber 38 having a lens effect are fused and connected by discharge, and the length of the GI fiber 38 is adjusted to about 630 $\mu$m by abrasion. The GI fiber 38 has a length of about 630 $\mu$m and enlarges a beam having a diameter of 10 $\mu$m to a beam having a diameter of about 40 $\mu$m.

Next, a fused assembly of core enlarged fiber 35 and GI fiber 38 is inserted into the left and right through holes 33a from one end face of the ferrule 33, and fixed such that an end face of the GI fiber 38 coincides with a rear end face 33c of the ferrule 33. After a portion of the core enlarged fiber 35 projecting from the leading end 33b of the ferrule 33 is cut at a specified position, a leading sphere 39 is formed at the cut end by discharge, abrasion or like means. Further, in the groove 37 previously formed in the ferrule 33, the groove 40 having a width of 800 $\mu$m for dividing the core enlarged fiber 35 into the core enlarged fibers 35a, 35b is formed in parallel to the groove 37 (at an angle of 2°).

The optoisolator 32 fabricated by integrally assembling polarizers 32a, 32b and a Faraday rotator 32c is arranged in the groove 40, and transparent adhesives 51 are provided between light incident and emerging surfaces of the polarizers 32a, 32b and the respective ends of the core enlarged fibers 35a, 35b. As described above, no magnetic field applying means is shown here.

In the fiber stub type optical device S2 thus constructed, light incident on the leading sphere 39 of the core enlarged fiber 35a transmits along the core enlarged fiber 35b after passing through the optoisolator 32 in the groove 40, and emerges out of the fiber stub type optical device S2 after having its beam diameter converted to 10 $\mu$m by the GI fiber 38. This fiber stub type optical device S2 has the same shape as the ferrule 33 at the rear end face 33c, and is connected with a connector (not shown) having a ferrule holding a single-mode fiber for transmission in the middle.

In this embodiment, the leading sphere 39 is formed at the portion of the core enlarged fiber 35 projecting from the leading end face 33b of the ferrule 33. However, instead of the leading sphere 39, a lens 36 for coupling the core enlarged fiber may be fixed by a lens holder 42 at the leading end face 33b of the ferrule 33.

In the case that the core enlarged fiber is cut when the groove 40 is actually formed, SDC320R10MB01 (No. 320) manufactured by DISCO is needed, for example, as a blade of a dicing saw if the core enlarged fiber is cut simultaneously with the ferrule made of zirconia. This is to cut zirconia which has a high hardness and is difficult to machine. However, as is clear from FIG. 30, if the mode field diameter is 40 μm and the fiber spacing is 800 μm, a loss of less than 0.7 dB is theoretically expected. However, it is found out that if the core enlarged fiber is cut by the dicing saw having the above blade, roughness of the cut face became considerably large and the loss exceeded 5 dB.

On the other hand, if NBC-Z2050 (No. 2000) manufactured by DISCO is used, the loss can be suppressed to about 1.5 dB. Since at least part of the groove is filled, at a final stage, with the adhesive 51 having its refractive index adjusted, the loss can be suppressed to 1 dB or below.

If the side or circumferential surface of the cladding is in contact with air or a member having a lower refractive index than the cladding, light leaked into the cladding is reflected at the boundary between the cladding and the outside and transmits through the cladding. On the other hand, if this surface is in contact with a member having a higher refractive index than the cladding, light leaked into the cladding escapes into the outside. Accordingly, it is necessary to carefully select an adhesive if the core enlarged fiber 35 is fixed to the ferrule 33.

Figure 8B:
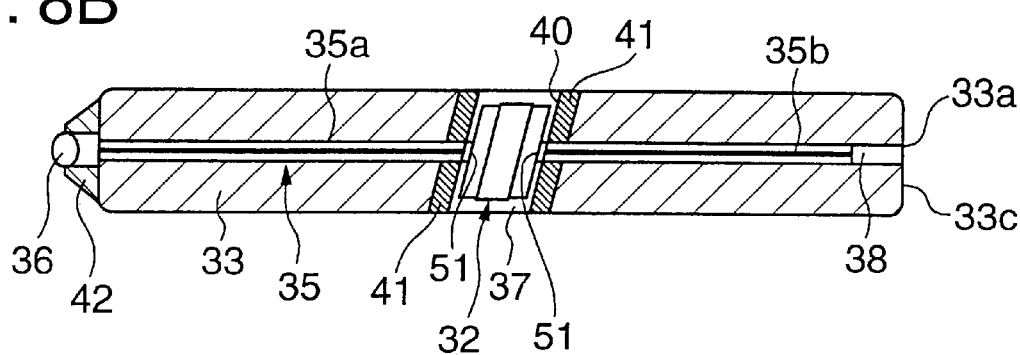

Further, as is clear from FIGS. 8A and 8B, if the groove 37 is formed before inserting the core enlarged fiber 35 into ferrule 33, one end of each of the core enlarged fibers 35a, 35b is exposed in the groove 37. Accordingly, if the side portions of the core enlarged fibers 35a, 35b exposed in the groove 37 are covered by the protection member 41 made of an adhesive having a higher refractive index than the cladding and then the groove 40 for dividing the core enlarged fiber 35 is formed, light transmitting through the cladding, a so-called cladding mode can be eliminated.

In this way, since the cladding mode can be eliminated, the adhesive can be selected in consideration of characteristics such as thermal expansion and shrinkage upon setting in portions of the core enlarged fiber 35 in contact with something other than the ferrule 33.

Figure 9:
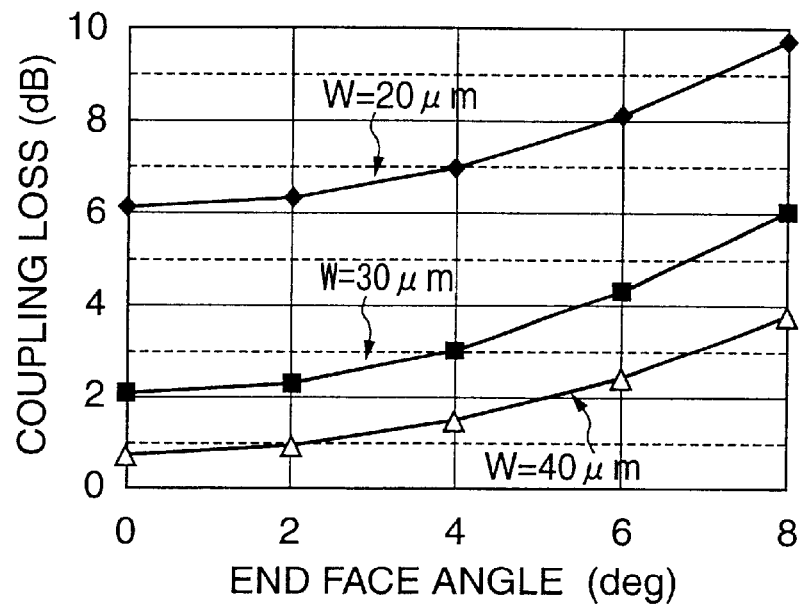
FIG. 9 is a graph showing a relationship between an end face angle and coupling loss at respective mode field diameters of core enlarged fibers.
Figure 10:
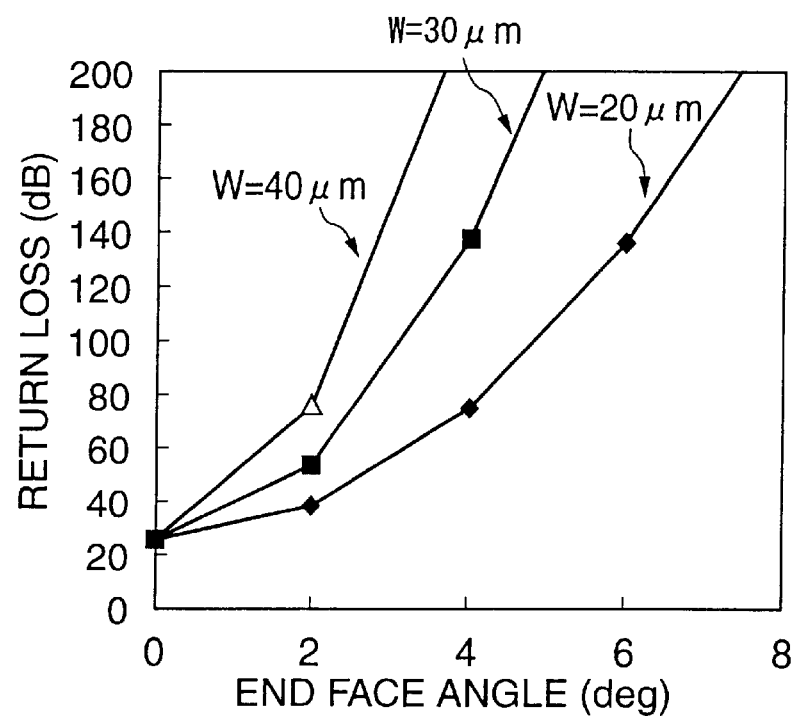
FIG. 10 is a graph showing a relationship between an end face angle and return loss at respective mode field diameters of core enlarged fibers.

FIG. 9 shows a relationship between a groove angle (angle of the end face) and coupling loss at the respective mode field diameters of the core enlarged fiber 35 when a groove having a width of 850 μm is obliquely formed in the ferrule 33 with respect to a plane normal to the longitudinal axis of the ferrule 33 and an optoisolator 32 having a thickness of 750 μm is inserted into this groove. FIG. 10 shows a relationship between a groove angle (angle of the end face) and return loss at the respective mode field diameters of the core enlarged fiber 35 when a groove having a width of 850 μm is similarly formed and an optoisolator having a thickness of 750 μm is inserted in this groove. Here, the return loss is an amount of light which enters the core again after being reflected and, accordingly, does not include the light transmitting through the cladding, i.e., the cladding mode. Further, it is assumed that an adhesive having its refractive index adjusted to that of the core of the core enlarged fiber is filled between the optoisolator and the core enlarged fiber, and that a reflection preventing film whose reflection rate is 0.2% or less is formed on the outer surface of the optoisolator.

It can be understood from FIG. 9 that coupling can be realized at a loss of 1 dB or less if the mode field diameter is 40 μm and the angle with respect to the end face is 2° even if the groove is obliquely formed. On the other hand, it can be predicted from FIG. 10 that the larger the mode field diameter and the larger the angle with respect to the end face, the larger the return loss. If the mode field diameter is 40 μm, the return loss is 70 dB at the angle of 2° with respect to the end face. Thus, a sufficient characteristic can be obtained.

However, since there is, in reality, a possibility that the light slightly reflected by the outer surface of the optoisolator obliquely arranged transmits through the cladding and returns to the LD, it is desirable to take a measure against the cladding mode in order to obtain a designed characteristic.

EXAMPLE 3

Hereafter, a more specific example of the fiber stub type optical device S2 according to the second embodiment is described.

Figure 11A:
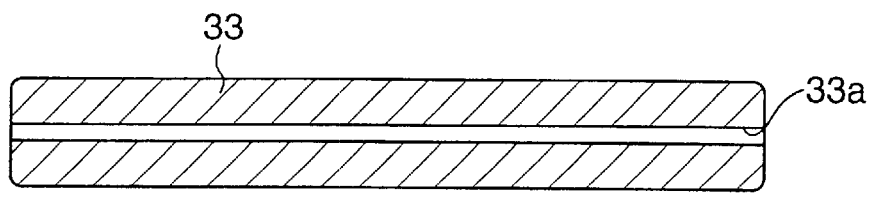
FIGS. 11A to 11F are sectional views diagrammatically showing a production process of the fiber stub type optical device according to the second embodiment.

This example is described with reference to FIGS. 11A to 11F. First, as shown in FIG. 11A, a ferrule 33 made of zirconia having a through hole 33a in its longitudinal axis, a diameter of 1.25 mm and a length of 12 mm is prepared. As shown in FIG. 1B, a groove 37 having a width of 1.5 mm is formed in the middle of the ferrule 33 in such a manner as to cross the through hole 33a at 2° with respect to the end face of the ferrule 33 (plane normal to the longitudinal axis). SDC320R10MB01 manufactured by DISCO is used for this machining.

Next, as shown in FIG. 1C, a straight core enlarged fiber 35 having a mode field diameter of 40 μm and having no tapered portion and a GI fiber 38 having a lens effect are fused and connected by discharge, and the length of the GI fiber 38 is adjusted to about 630 μm by abrasion. The GI fiber 38 have a length of about 630 μm and enlarged a beam of 10 μm to a beam of about 40 μm.

Figure 11B:
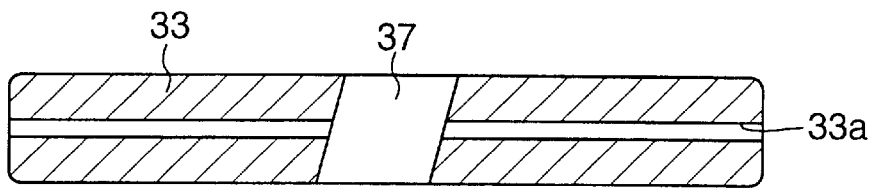
Figure 11C:
Figure 11D:
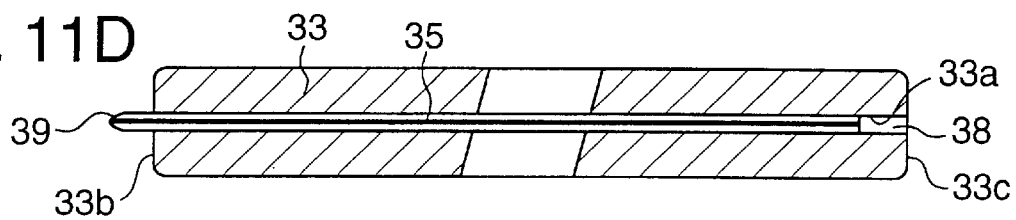
Figure 11E:
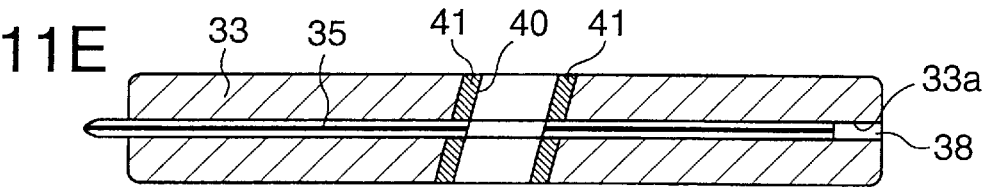

Next, as shown in FIG. 11D, a fused assembly of the core enlarged fiber 35 and the GI fiber 38 are inserted into the through hole 33a from one end face of the ferrule 33, and fixed such that an end face of the GI fiber 38 coincided with a rear end face 33c of the ferrule 33. After a portion of the core enlarged fiber 35 projecting from a leading end 33b of the ferrule 33 is cut at a specified position, a leading sphere 39 is formed at the cut end by discharge, abrasion or like means. Next, as shown in FIG. 11E, a portion of the core enlarged fiber 35 exposed in the groove 37 is covered by a protection member 41 made of an adhesive such as an epoxy ultraviolet setting adhesive (an epoxy adhesive which sets upon being exposed to ultraviolet), and then a groove 40 having a width of 800 μm for dividing the core enlarged fiber 35 into the core enlarged fibers 35a, 35b is formed in the groove 37 in parallel with the groove 37 (at an angle of 2°). Here, NBC-Z2050 manufactured by DISCO is used. In this way, the side (circumferential) surfaces of the ends of the core enlarged fibers 35a, 35b projecting into the groove 37 are covered by the protection member 41.

Figure 11F:
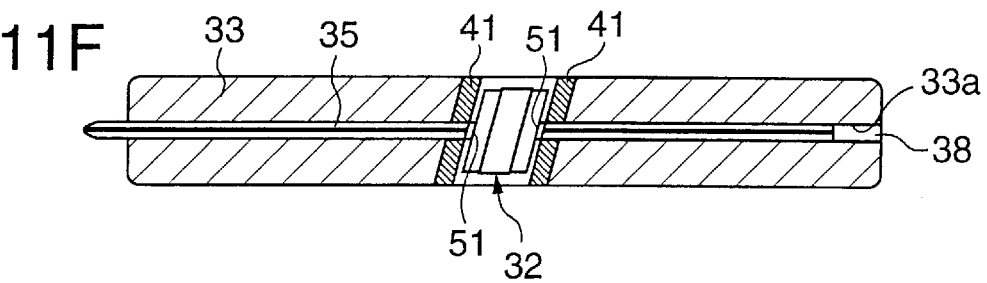

Next, as shown in FIG. 11F, an optoisolator 32 fabricated by integrally assembling polarizers 32a, 32b and a Faraday rotator 32c is arranged in the groove 40. Here, the optoisolator 32 and the core enlarged fibers 35a, 35b are fixed by an adhesives 51 such as an ultraviolet setting adhesive having its refractive index adjusted to that of the core enlarged fibers 35a, 35b.

The optoisolator 32 is comprised of the polarizers 32a, 32b (thickness: 200 μm, refractive index: 1.5) and the Faraday rotator 32c (magnetic garnet having a thickness of 350 μm and a refractive index of 2.2). The respective elements are joined together by a transparent epoxy adhesive after having reflection preventing films formed on their light transmitting surfaces. The optoisolator 32 is formed by, after a large square device having one side of 10 mm are aligned at once, cutting this device into smaller square pieces having one side of 400 µm, and the thickness thereof is 750 µm. Here, no magnet is necessary since the garnet having a property of spontaneous magnetization is used.

In the invented fiber stub type optical device S2, the leading sphere 39 is formed at the end face of the core enlarged fiber toward the LD in order to simultaneously prevent diffraction and improved coupling efficiency when the device S2 is mounted in an optical module such as an LD module. Further, depending upon the design of the optical module, the device S2 may be such that a lens 36 for coupling the core enlarged fiber is provided at the leading end face of the ferrule 33 by being fixed by a lens holder 42 as shown in FIG. 8B. The construction show in FIG. 8B is similar to that shown in FIG. 8A except that the lens 36 is fixed by the lens holder 42. In this case, coupling efficiency is further improved since a lens optimal to couple the LD (not shown) and the core enlarged fiber 35 can be selected.

EXAMPLE 4

Figure 12:
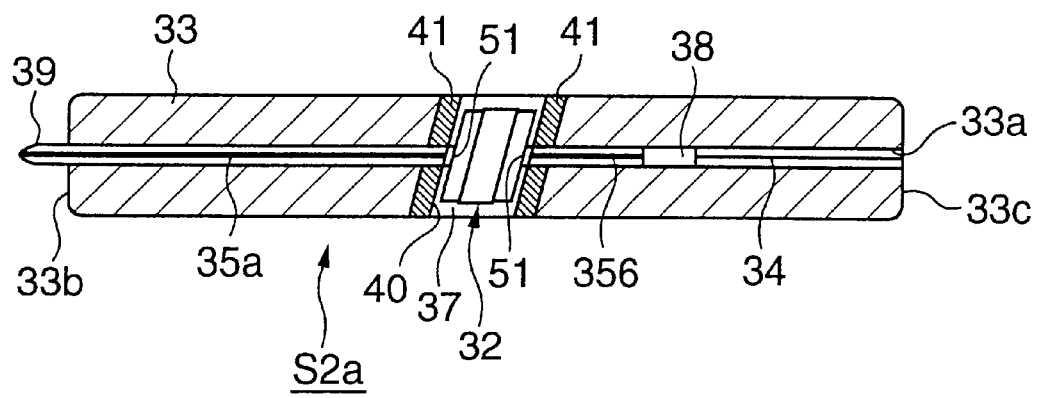
FIG. 12 is a sectional view showing another fiber stub type optical device according to the second embodiment.

As shown in FIG. 12, a fiber stub type optical device S2a is constructed by further connecting a single-mode fiber 34 for transmission with the rear end of a GI fiber 38 in the through hole 33a of the fiber stub type optical device S2 of EXAMPLE 3.

Specifically, the GI fiber 38 is fused and connected with a core enlarged fiber 35, and the single-mode fiber 34 for transmission having a mode field diameter of 10 µm is fused and connected with the GI fiber 38 after the length of the GI fiber 38 is adjusted to about 630 µm.

This fused and connected assembly of the fibers is inserted and fixed in the ferrule 33 having a groove 37 which has a width of 1.5 mm and is at an angle of 2° with respect to the end face. Then, a groove 40 having a width of 800 µm for dividing the core enlarged fiber 35 into core enlarged fibers 35a, 35b is formed as in EXAMPLE 3, and an optoisolator 32 constructed by integrally assembling polarizers 32a, 32b and a Faraday rotator 32c is arranged and fixed in the groove 40 as in EXAMPLE 3. It should be noted that a leading sphere 39 is formed at an end of the core enlarged fiber 35 by discharge or abrasion in order to improve coupling efficiency with an LD.

This fiber stub type optical device S2a has the same shape as the ferrule 33 at the rear end face 33c and is to be connected with a connector (not shown) having a ferrule for holding a single-mode fiber for transmission in the middle. In this construction, since the fused assembly of the GI fiber 38 and the single-mode fiber 34 is held in the ferrule 33, connection with an external connector is made by the same single-mode fibers for transmission. Therefore, the device S2a has a more stable connection characteristic than the device S2 of EXAMPLE 3 in which the GI fiber and the single-mode fiber for transmission are connected at a boundary surface.

EXAMPLE 5

Figure 13:
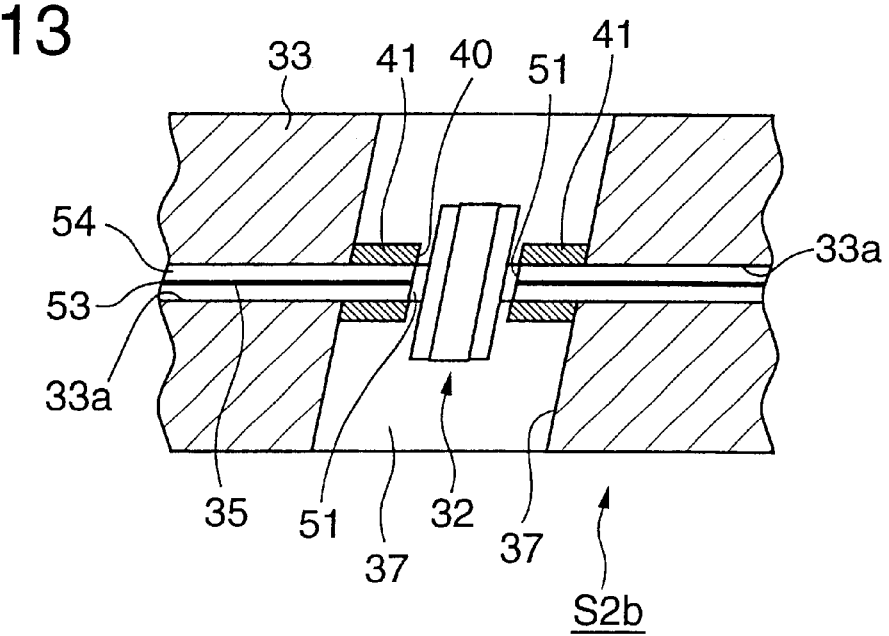
FIG. 13 is a sectional view showing only an essential portion of still another fiber stub type optical device according to the second embodiment.

A fiber stub type optical device S2b is constructed whose essential portion is only shown in FIG. 13 in order to improve return loss in the fiber stub type optical devices S2, S2a of EXAMPLES 3 and 4.

A method for producing the fiber stub type optical devices S2b as shown in FIG. 13 is described with reference to FIGS. 11A 11f. First, as shown in FIG. 11A, a ferrule 33 made of zirconia and having a diameter of 1.25 mm and a length of 12 mm is prepared. In the middle of the ferrule 33, a groove 37 having a width of 1.5 mm is so formed as to cross a through hole 33a at an angle of 2° with respect to an end face of the ferrule 33 as shown in FIG. 11B. A dicing blade SDC320 R10MB01 manufactured by DISCO is used for machining.

Next, as shown in FIG. 11C, a straight core enlarged fiber 35 having a mode field diameter of 40 µm and no tapered portion and a GI fiber 38 having a lens effect are fused and connected by discharge, and the length of the GI fiber 38 is adjusted to about 630 µm by abrasion. The GI fiber 38 have a length of about 630 µm and enlarged a beam having a diameter 10 µm to a beam having a diameter of about 40 µm.

Next, as shown in FIGS. 11D and 11E, a portion of the core enlarged fiber 35 exposed in the groove 37 when the fused assembly of the core enlarged fiber 35 and the GI fiber 38 is inserted into the through hole 33a and fixed such that the end face of the GI fiber 38 coincided with a rear end face 33c of the ferrule 33 is covered and fixed by a protection member 41 made of an adhesive having a larger refractive index than a cladding such as an epoxy ultraviolet setting adhesive. A separate adhesive having a small degree of shrinkage on setting is used inside the through hole 33a. The protection member 41 is not provided up to the outer circumferential surface of the ferrule 33 as shown in FIG. 11E, but provided only in vicinity of the circumferential surface of the core enlarged fiber 35 as clearly shown in FIG. 13.

After cutting a portion of the core enlarged fiber 35 projecting from a leading end face 33b of the ferrule 33, a leading sphere 39 is formed by discharge or abrasion. In the groove 37 previously formed in the ferrule 33, a groove 40 having a width of 800 µm for dividing the core enlarged fiber 35 is formed in parallel with (at an angle of 2° with respect to the end face of the ferrule 33) the groove 37. A dicing blade NBC-Z2050 manufactured by DISCO is used for machining.

Then, as shown in FIG. 11F, an optoisolator 32 constructed by integrally assembling polarizers 32a, 32b and a Faraday rotator 32c is arranged and fixed in the groove 40. In this EXAMPLE, the optoisolator 32 is fixed by an epoxy ultraviolet setting adhesive whose refractive index is adjusted to that of the core enlarged fiber 35.

FIG. 13 enlargedly shows a portion of the device S2b near the grooves 37, 40. Since the outer circumferential surface of the core enlarged fiber 35 is covered by the protection member 41 made of the adhesive having a higher refractive index than a cladding 54, light leaked into the cladding 54 is irradiated to the outside. The optoisolator 32 is fixed between the core enlarged fibers 35 and an adhesive 51 having its refractive index adjusted to that of the core enlarged fibers 35 is filled in clearances between the optoisolator 32 and the core enlarged fibers 35. Identified by 53 is a core.

EXAMPLE 6

In EXAMPLE 5, if the entire groove 37 should be covered by a light absorbing member after the optoisolator 32 is fixed, it would prevent the light irradiated to the outside from the cladding from being reflected in an unexpected position and becoming a stray light. In addition, reliability is improved because the entire optically coupling portion is covered.

Figure 14:
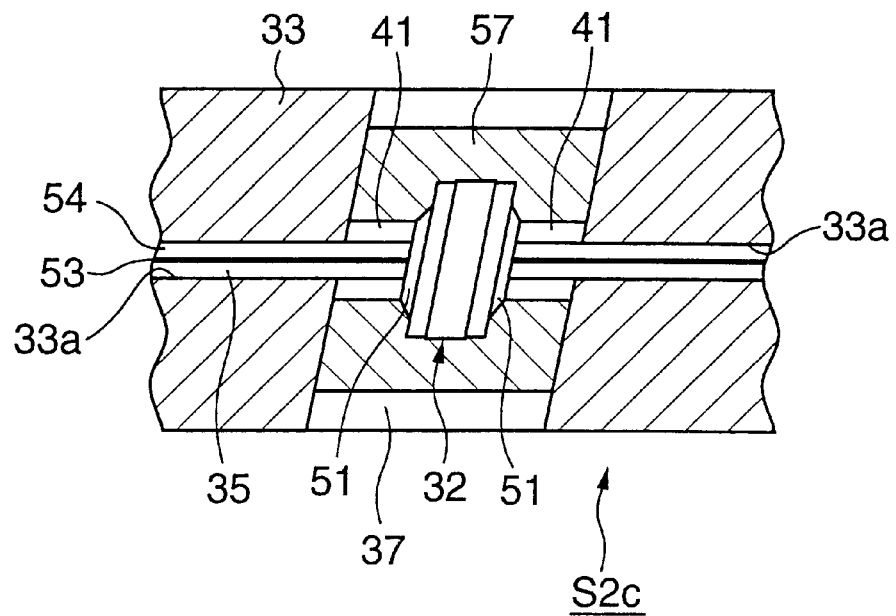
FIG. 14 is a sectional view showing only an essential portion of further another fiber stub type optical device according to the second embodiment.

FIG. 14 enlargedly shows a portion of a fiber stub type optical device S2c near grooves 37, 40. The outer circumferential surface of a cladding 54 of a core enlarged fiber 35 is covered by a protection member 41 made of an ultraviolet setting adhesive having a higher refractive index than the cladding 54 as in EXAMPLE 5, an optoisolator 32 is fixed between the core enlarged fibers 35, and an adhesive 51 having its refractive index adjusted to that of the core enlarged fibers 35 is filled in clearances between the optoisolator 32 and the core enlarged fibers 35. Further, an entire assembly in the groove 37 including the protection member 41 and the optoisolator 32 is covered by a light absorbing member 57, which is made of a material having a high moisture resistance or having a water absorption of 0.1 percent or less, for example, by blackening a material containing an epoxy resin as a main component.

Further, it may be appreciated to use a moisture resistive resin having a water absorption of 0.1 percent or less, and dispersed with ferromagnetic powder as a material for the light absorbing member 57, and fill the resin including ferromagnetic powder in the space to cover the optoisolator 32, and magnetize the resin in the same magnetic direction as the Faraday rotator of the optoisolator 32. As examples of the resin, there are thermosetting epoxy resin and photo-curing epoxy resin. Also, As examples of the ferromagnetic powder, there are powder of samarium cobalt or powder of barium ferrite. Such magnetic material is added by about 70 weight percent to the resin. This magnetic light absorbing member can eliminate an external magnetic field applying means.

EXAMPLE 7

Figure 15:
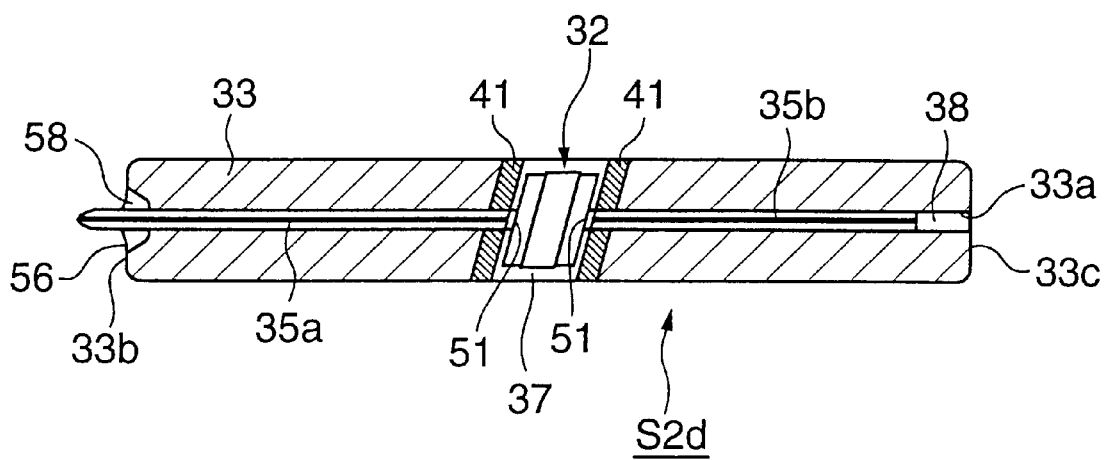
FIG. 15 is a sectional view showing still further another fiber stub type optical device according to the second embodiment.

A fiber stub type optical device S2d shown in FIG. 15 differs from those in EXAMPLES 3 to 6 in that a leading end face 33b of a ferrule 33 is airtightly sealed. A recess 56 for filling an adhesive is formed at the leading end face 33b of the ferrule 33. When a core enlarged fiber 35 and a GI fiber 38 fused and connected with each other are inserted and fixed in a through hole 33a, an airtight sealing agent 58 made of a low-boiling glass is filled into the recess 56 and molten by heating. Any other suitable material such as solder can be used as the airtight sealing agent 58.

In the case of solder, there is a method called ultrasonic soldering, and soldering can be directly applied to glass or ceramic even if the outer surface is not metal-plated. In this way, the front end face 33b of the ferrule 33 is airtightly sealed by an inorganic joining member. After the leading end face 33b is airtightly sealed, fixing may be made by an ultraviolet setting adhesive in the groove 37 as in EXAMPLES 5 and 6. An optoisolator 32 fixed by being held between the core enlarged fibers 35 is also joined as in EXAMPLES 3 to 6.

Accordingly, in the case that an optical module is constructed by mounting the inventive fiber stub type optical device, no external air enters the optical module from this optical device. Although there is a likelihood that gas may be generated from the adhesive over a long time, an LD in the optical module is not influenced since airtight sealing is secured at the leading end face 33b of the ferrule 33.

EXAMPLE 8

Figure 16:
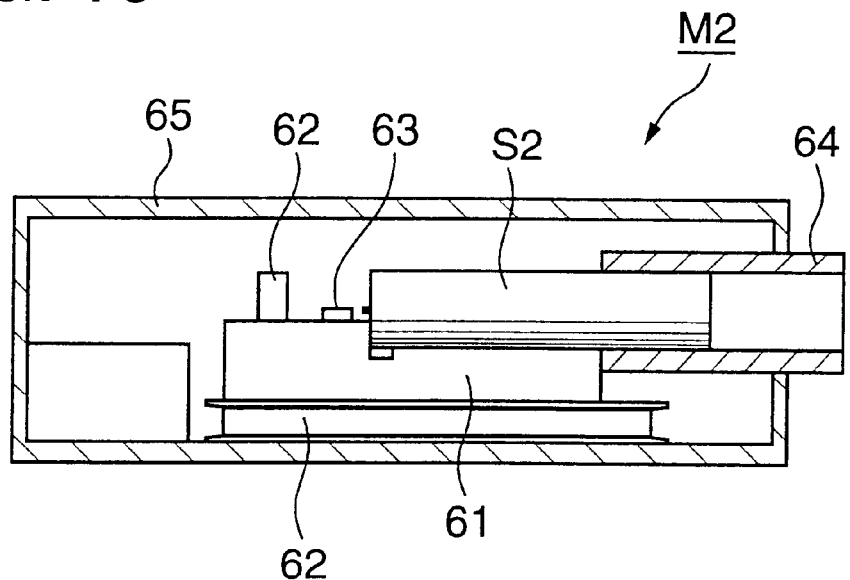
FIG. 16 is a sectional view diagrammatically showing an optical module according to the second embodiment.

An example of an optical module (LD module) constructed by using the fiber stub type device S2. S2a, S2b, S2c or S2d formed in EXAMPLES 3 to 7 is shown in FIG. 16. Specifically, in this optical module M2, the fiber stub type optical device S2 (S2a, S2b, S2c, S2d) having a leading sphere at its end face toward a LD is fixed in a V-shaped groove of a Si platform 61 as a substrate. A LD 63 stably operated while being held at a constant temperature by placing the Si platform 61 on a Peltier cooler 66. A light detector 62 monitored light emitted from the LD 63 in order to stabilize a luminous intensity. A sleeve 64 is externally fitted to a connector (not shown) for optically coupling it with the fiber stub type optical device S2. The entire module M2 is airtightly sealed in a package 65.

Although the LD module is described as the optical module M2 in this EXAMPLE, the present invention is not limited thereto. The optical module M2 may be applied to optical modules in which only a light emitter is provided without a light detector or optical modules in which only a light detector is provided without a light emitter.

The thus constructed fiber stub type optical devices S2, S2a, S2b, S2c and S2d and optical module M2 according to the second embodiment of the invention have following remarkable effects.

(a) In order to fabricate the fiber stub type optical device, it is sufficient to adjust only a connecting portion of the GI fiber and the core enlarged fiber, and the insertion of the optoisolator at a later stage can be performed substantially alignment-free. Further, since the optical coupling system can be assembled before the optoisolator is inserted, the number of operation steps can be significantly reduced. Despite the use of the core enlarged fiber, cutting of the fiber which causes no increase in loss and an improvement in return loss are enabled while maintaining an advantage that the fiber stub type optical device can be fabricated by far simpler operation steps for a far shorter time than the conventional one.

(b) In the case of using the core enlarged fiber as an optical fiber, no strict control of a temperature gradient is necessary during the fabrication of the core enlarged fiber since no tapered portion is necessary (since the core enlarged fiber is straight). Further, the fiber stub type optical devices can be mass-produced.

(c) Since the core enlarged fiber needs to have no tapered portion, it is not necessary to consider variations of parameters largely influential to characteristics such as a length of the tapered portion and a taper angle for each part. Thus, fiber stub type optical devices having a high reliability can be provided.

(d) Since formation of the groove in the ferrule and cutting of the core enlarged fiber are separated and optimal blades can, accordingly, be used for each machining, an increase of the loss due to rough cut surfaces of the core enlarged fiber can be suppressed to a minimum level. Thus, fiber stub type optical devices having a high reliability can be provided.

(e) By separating formation of the groove in the ferrule and cutting of the core enlarged fiber, the cladding mode can be eliminated taking advantage of the side portion of the core enlarged fiber exposed in the groove of the ferrule. Thus, excellent fiber stub type optical devices having a large return loss can be provided.

(f) Excellent optical modules which are small in size, easy to fabricate, inexpensive and change with time to a small degree can be provided.

(g) Excellent optical modules in which a state of optical coupling in the fiber stub does not change even if the position of the fiber stub type optical device and that of the LD are displaced from each other can be provided.

(h) Since the optical module can be optically adjusted only by adjusting the positions of the LD and the fiber stub type optical device, optical modules which can be easily assembled can be provided.

(i) Since airtight sealing can be easily and securely provided, optical modules having a high reliability can be provided.

Figure 17:
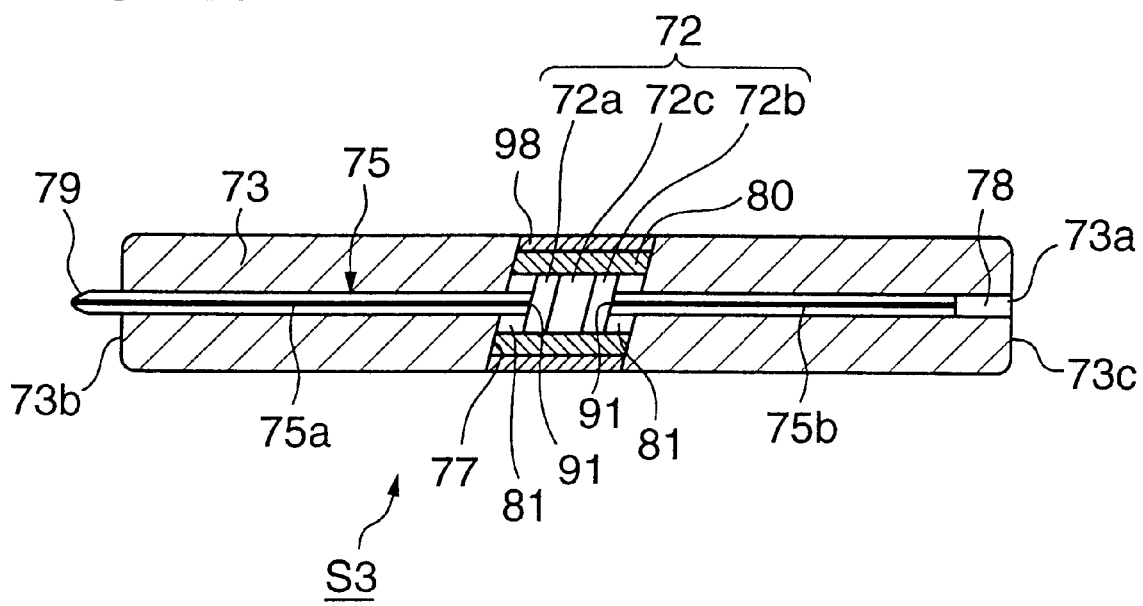
FIG. 17 is a sectional view diagrammatically showing a fiber stub type optical device according to a third embodiment of the invention.

FIG. 17 is a sectional view showing a fiber stub type optical device according to a third embodiment of the invention. As shown in FIG. 17, a fiber stub type optical device S3 is constructed such that a core enlarged fiber 75 (75a, 75b) which is an optical fiber whose mode field diameter is, for example, 40 µm or larger, and a GI fiber 78 having a mode field diameter smaller than that of the core enlarged fiber 75 (for example, about 10 µm) for converting the mode field diameter for optical connection with an external single-mode fiber for transmission (not shown) are accommodated in a ferrule 73 made of alumina which is diamagnetic at normal temperatures. The GI fiber 78 is accommodated at one end of the ferrule 73.

The core enlarged fibers 75a, 75b are arranged in tow through holes 73a at the left and right sides of a groove 77, and one end of each core enlarged fiber 75a, 75b projects into the groove 77. The side (circumferential) surfaces of the ends of the core enlarged fibers 75a, 75b projecting into the groove 77 are covered by protection members 71 having a higher refractive index than a cladding of the core enlarged fiber, so that these ends of the core enlarged fibers 75a, 75b can be optically connected via an optoisolator 72 provided in the groove 77.

The mode field diameter of the optical fibers are enlarged to 40 µm or larger as described above for the following reason. Assuming the use of an optoisolator which is thinnest among optical devices to be inserted into the groove between the optical fibers, the width of the groove needs to be at least 800 µm. In order to join the optical fibers with a loss of 1 dB or less, the mode field diameter needs to be 40 µm or larger.

The core enlarged fiber 75b which is a single mode fiber and the GI fiber 38 for converting the mode field diameter to the one compatible with an external single-mode fiber for transmission are connected in series in at least one of the through holes 73a accommodating the core enlarged fibers 75a, 75b.

The core enlarged fiber 75 is arranged in the ferrule 73, for example, in the following procedure. Specifically, before the core enlarged fiber 75 is inserted, the groove 77 crossing the through hole 73a is formed, and then the single core enlarged fiber 75 is inserted and fixed in the left and right through holes 73a while being also located in the groove 77. After an exposed section (fiber side surface) of the core enlarged fiber 75 in the groove 77 is covered by the protection member 81 having a larger refractive index than the cladding of the core enlarged fiber 75, the core enlarged fiber 75 is divided into the core enlarged fibers 75a, 75b at the groove 77 so that the protection members 81 are provided at the respective ends of the core enlarged fibers 75a, 75b. The optoisolator 72 is arranged in a groove 80 formed in the groove 77 by dividing the core enlarged fiber 35.

Specifically, the groove 77 having a width of about 1.5 mm is formed in the middle of the ferrule 73 having, for example, a diameter of about 1.25 mm and a length of about 12 mm such that it crosses the through hole 73a at an angle of 2° with respect to the leading end face (i.e., plane normal to the longitudinal axis) 73b of the ferrule 73.

Next, the core enlarged fiber 75 having an unchanging mode field diameter of about 40 µm and the GI fiber 78 having a lens effect are fused and connected by discharge, and the length of the GI fiber 78 is adjusted to about 630 µm by abrasion. The GI fiber 78 has a length of about 630 µm and enlarges a beam having a diameter of 10 µm to a beam having a diameter of about 40 µm.

Next, a fused assembly of core enlarged fiber 75 and GI fiber 78 is inserted into the left and right through holes 73a from one end face of the ferrule 73, and fixed such that an end face of the GI fiber 78 coincides with a rear end face 73c of the ferrule 73. After a portion of the core enlarged fiber 75 projecting from the leading end 73b of the ferrule 73 is cut at a specified position, a leading sphere 79 is formed at the cut end by discharge, abrasion or like means. Further, in the groove 77 previously formed in the ferrule 73, the groove 80 having a width of 800 µm for dividing the core enlarged fiber 75 into the core enlarged fibers 75a, 75b is formed in parallel to the groove 77 (at an angle of 2°).

The optoisolator 72 fabricated by integrally assembling polarizers 72a, 72b and a Faraday rotator 72c which is a polarization plane rotating portion and has a property of spontaneous magnetization is arranged in the groove 80, and transparent adhesives 91 are provided between light incident and emerging surfaces of the polarizers 72a, 72b and the respective ends of the core enlarged fibers 75a, 75b. Finally, a covering plate 98 made of alumina is joined.

In the fiber stub type optical device S3 thus constructed, light incident on the leading sphere 79 of the core enlarged fiber 75a transmits along the core enlarged fiber 75b after passing through the optoisolator 72 in the groove 80, and emerges out of the fiber stub type optical device S3 after having its beam diameter converted to 10 µm by the GI fiber 78. This fiber stub type optical device S3 has the same shape as the ferrule 73 at the rear end face 73c, and is connected with a connector (not shown) having a ferrule holding a single-mode fiber for transmission in the middle.

This fiber stub type optical device S3 is constructed such that magnetic lines of flux are unlikely to enter since the ferrule 73 is made of alumina which is diamagnetic at normal temperatures. Instead of making the ferrule 73 of a diamagnetic material, an outer surface portion of the groove 80 may be covered by a diamagnetic material as described later. Such a construction can also make magnetic lines of flux unlikely to enter the device S3. A thickness of the diamagnetic material covering the outer surface portion of the groove 80 may be about 300 to 500 µm.

EXAMPLE 9

Figure 18A:
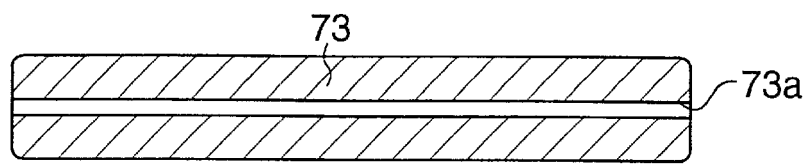
FIGS. 18A to 18G are sectional views diagrammatically showing a production process of the fiber stub type optical device according to the third embodiment.
Figure 18B:
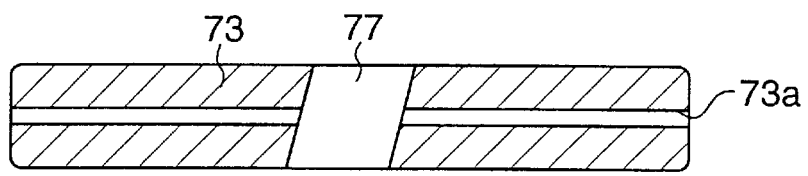

A specific example of the fiber stub type optical device S3 is described with reference to FIGS. 18A to 18G. First, as shown in FIG. 18A, an alumina ferrule 73 having a diameter of 1.25 mm and a length of 12 mm is prepared. In the middle of the ferrule 73, a groove 77 having a width of 1.5 mm is so formed as to cross a through hole 73a at an angle of 2° with respect to an end face of the ferrule 77 as shown in FIG. 18B. A dicing blade SDC320R10MB01 manufactured by DISCO is used for machining.

Figure 18C:

Next, as shown in FIG. 18C, a straight (having no tapered portion) core enlarged fiber 75 having a mode field diameter of 40 µm and a GI fiber 78 having a lens effect are fused and connected by discharge, and the length of the GI fiber 78 is adjusted to about 630 µm by abrasion. The GI fiber 78 has a length of about 630 µm and enlarged a beam having a diameter 10 µm to a beam having a diameter of about 40 µm.

Figure 18D:
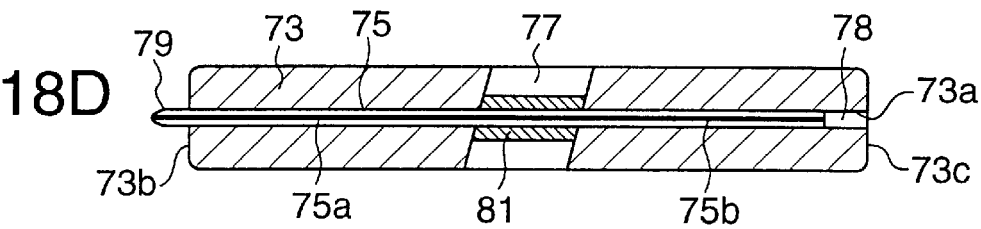

Next, as shown in FIG. 18D, a fused assembly of the core enlarged fiber 75 and the GI fiber 78 is inserted into the through hole 73a from one end face of the ferrule 73, and fixed such that an end face of the GI fiber 78 coincides with a rear end face 73c of the ferrule 73. After a portion of the core enlarged fiber 75 projecting from a leading end 73b of the ferrule 73 is cut at a specified position, a leading sphere 79 is formed at the cut end by discharge, abrasion or like means. The leading sphere 79 is formed in order to simultaneously prevent reflection and improve coupling efficiency when the device is mounted in a LD module. Further, the side (circumferential) surface of a portion of the core enlarged fiber 75 exposed in the groove 77 is covered by a protection member 81 made of an epoxy ultraviolet setting adhesive.

Figure 18E:
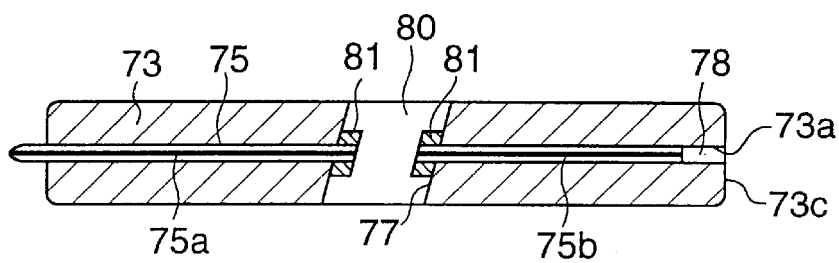

Next, as shown in FIG. 18E, a groove 80 having a width of 800 μm for dividing the core enlarged fiber 75b is formed in the groove 77 in parallel with the groove 77 (at an angle of 2°). Here, NBC-Z2050 manufactured by DISCO is used.

Figure 18F:
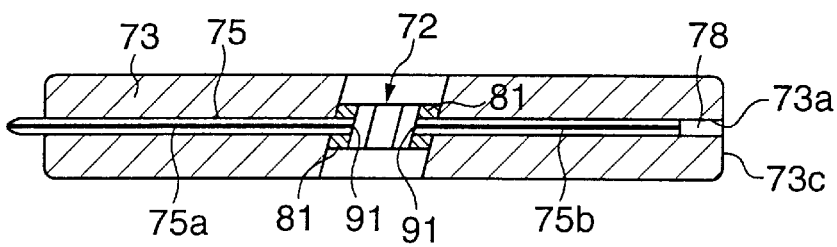

Next, as shown in FIG. 18F, an optoisolator 72 fabricated by integrally assembling polarizers 72a, 72b and a Faraday rotator 72c having a property of spontaneous magnetization is arranged in the groove 80. Here, the optoisolator 72 and the core enlarged fibers 75a, 75b are fixed by adhesives 91 such as an ultraviolet setting adhesive having its refractive index adjusted to that of the core enlarged fiber 75.

Figure 18G:
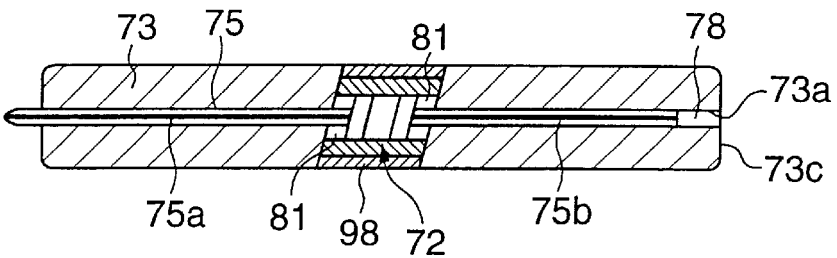

Further, as shown in FIG. 18G, a covering plate 98 made of alumina is so joined with the ferrule 73 by an epoxy thermosetting adhesive as to cover the outer surface of the optoisolator 72, thereby smoothing the outer circumferential surface of the ferrule 73.

The optoisolator 72 is comprised of the polarizers 72a, 72b (thickness: 200 μm, refractive index: 1.5) and the Faraday rotator 72c (magnetic garnet XL 22 manufactured by Lucent Corp. in the U.S. and having a thickness of 380 μm and a refractive index of 2.356) having a property of spontaneous magnetization. The respective elements are joined together by a transparent epoxy adhesive after having reflection preventing films formed on their light transmitting surfaces. The optoisolator 72 is formed by, after a large square device having sides of 10 mm are aligned at once, cutting this device into smaller square pieces having sides of 300 μm, and the thickness thereof is 780 μm. Here, no magnet is necessary since the garnet having a property of spontaneous magnetization is used.

Figure 19:
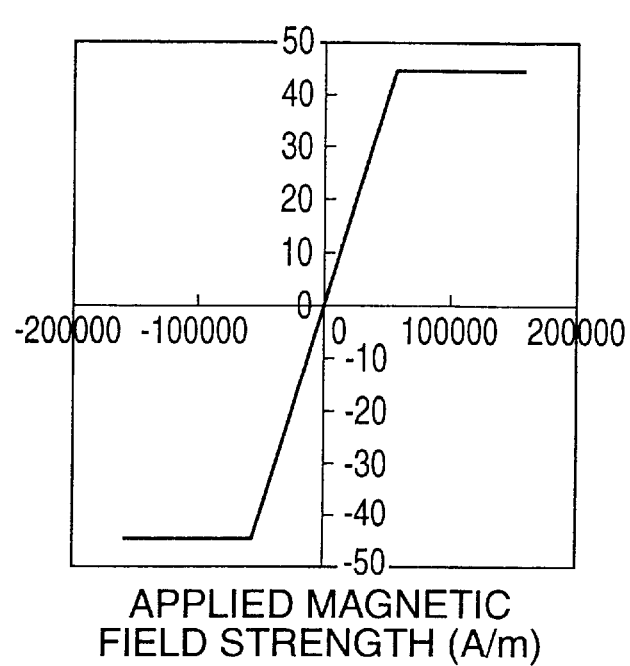
FIG. 19 is a graph showing a magnetic characteristic of a ferromagnetic Faraday rotator which requires a bias magnetic field.

In the present invention, magnetic fields present in the environments produced by peripheral electronic devices and the like are referred to as unnecessary external magnetic fields, whereas those applied to obtain Faraday rotation are referred to as bias magnetic fields. A normal ferromagnetic Faraday rotator (bismuth (Bi)-substituted garnet typically used as a Faraday rotator in an infrared range) which requires the bias magnetic field has a characteristic as shown in FIG. 19 in which a horizontal axis represents a bias magnetic field intensity (applied magnetic field intensity) and a vertical axis represents an angle of Faraday rotation. In the case of a magnetic material, an angle of Faraday rotation θ is proportional to magnetization M and is expressed by θ=VML where V, L denote a Verdet constant which is a numerical value peculiar to a material and a thickness of the material in a direction of magnetization. Adjustment is made in an optoisolator such that θ32 45°.

A ferromagnetic material has a proportion region where the angle of Faraday rotation is proportional to the bias magnetic field and a saturation region where it is saturated at a fixed value independently of the bias magnetic field. Since the angle of Faraday rotation changes upon a slight change of the bias magnetic field to thereby degrade isolative characteristics of an isolator in the proportion region, the ferromagnetic material is used in the saturation region by applying a sufficient bias magnetic field. For example, the applied magnetic field corresponding to a saturated magnetic field intensity of 63200 A/m is 79000 to 118500 A/m in FIG. 19. The bias magnetic field needs to be continuously applied since magnetization disappears if the bias magnetic field becomes zero. Thus, the ferromagnetic material is constantly used with a magnet.

Figure 20:
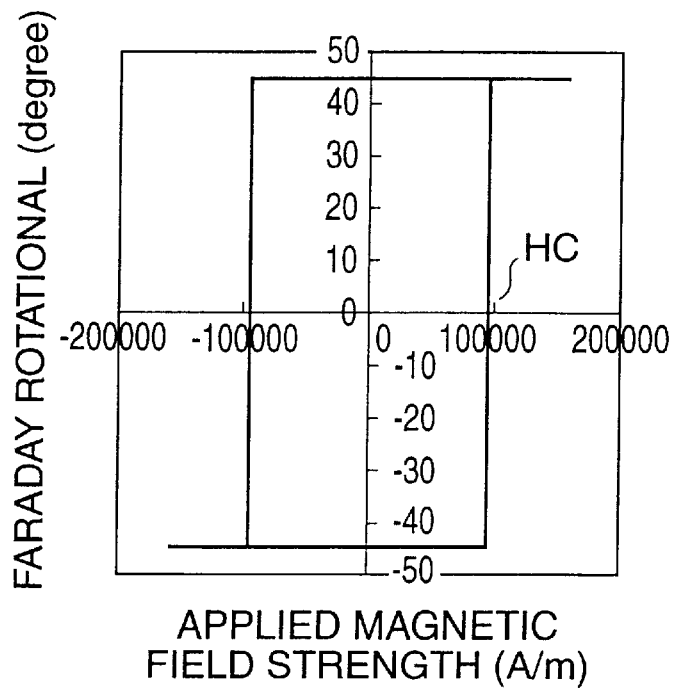
FIG. 20 is a graph showing a magnetic characteristic of a spontaneous magnetization Faraday rotator.

On the other hand, the Faraday rotator having a property of spontaneous magnetization has a characteristic as shown in FIG. 20. Similar to FIG. 19, a horizontal axis represents a bias magnetic field intensity (applied magnetic field intensity) and a vertical axis represents an angle of Faraday rotation. As can be seen from FIG. 20, the Faraday rotator having a property of spontaneous magnetization shows a hysteresis similar to magnets. Thus, it cannot be demagnetized once being magnetized unless a large reverse bias is applied in a reverse direction.

Accordingly, the characteristic is not degraded even if the unnecessary external magnetic field(s) exist(s) up to a holding force of Hc, obviating the need for a magnet. Usually, the outer diameter of the ferrule 73 is standardized from 1.25 mm to 2.5 mm. The use of the optoisolator including the Faraday rotator having a property of spontaneous magnetization is suitable for the miniaturization of the fiber stub type optical device.

Figure 21:
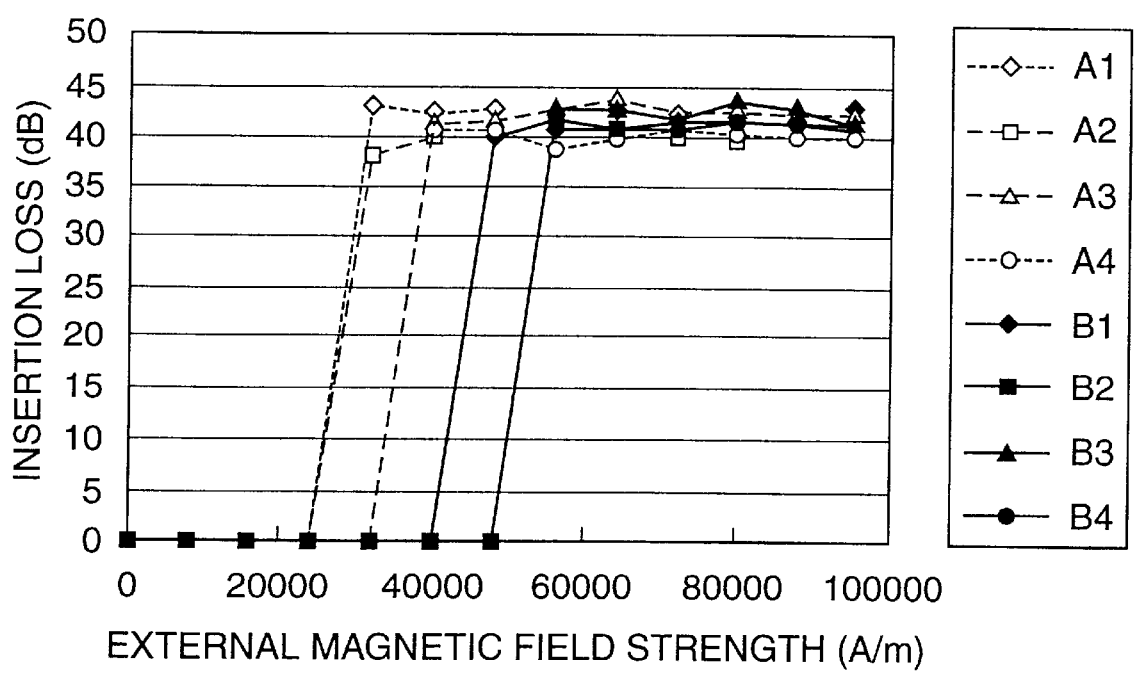
FIG. 21 is a graph showing a deterioration in the isolative characteristic of an optoisolator when a reverse bias magnetic field is applied to the optoisolator.

FIG. 21 shows measurement results of degradation of the characteristic when a reverse bias magnetic field is applied to the optoisolator. Specifically, a magnetic field is applied to the Faraday rotator in parallel to a direction of magnetization for 5 to 10 sec. and an insertion loss is measured. Samples A1 to A4 are optoisolators, and B1 to B4 are fiber stub type optical devices having the same construction as EXAMPLE 9 in which an alumina ferrule is covered by an alumina covering plate. Insertion losses of the samples A1 to A4 before the magnetic field is applied are 0.15 dB to 0.2 dB. After the application of the magnetic field, the insertion losses of the samples A1 to A4 are all degraded substantially before 31600 A/m and increased to 40 dB or larger. This indicates that the Faraday rotation is reversed by the reverse bias. On the other hand, three out of the four fiber stub type optical devices using the alumina ferrule and the alumina covering plate experienced no change up to 47400 A/m, showing an improvement in durability of 15800 to 23700 A/m against the external magnetic field.

EXAMPLE 10

Figure 22:
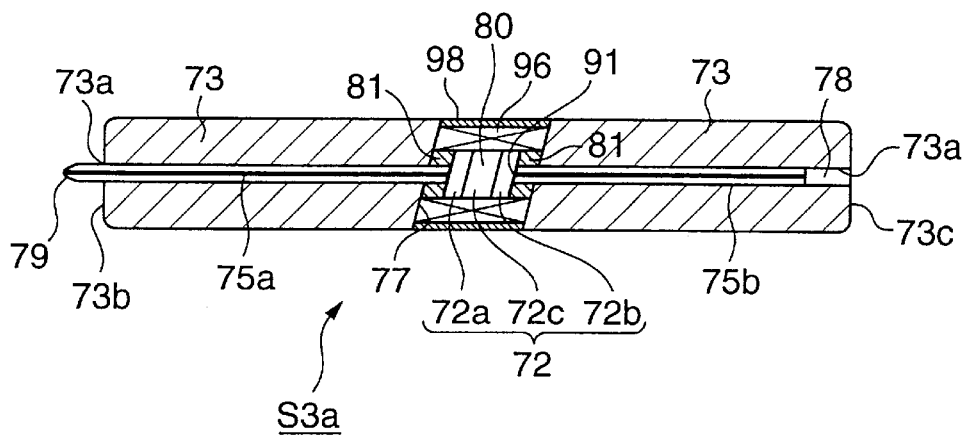
FIG. 22 is a sectional view showing another fiber stub type optical device according to the third embodiment.

As shown in FIG. 22, a magnet 96 for applying a compensation magnetic field is so provided as to cover the optoisolator 72 before the optoisolator 72 is arranged in the fiber stub type optical device S3 of EXAMPLE 9. This magnet 96 is made of samarium cobalt and is formed with a rectangular recess having sides of about 350 μm so that it could surround the square isolator having sides of 300 μm. The magnet 96 has a thickness of 1 mm. Since the Faraday rotator having a property of spontaneous magnetization is used, it is sufficient for the magnet 96 to have a magnetic field intensity for offsetting the unnecessary external magnetic fields. Thus, the magnet 96 can be much smaller than the one used together with a usual Faraday rotator which requires a bias magnetic field and, therefore, can be built in the ferrule 73 as in the present invention.

A fused assembly of a core enlarged fiber 75 and a GI fiber 78 is inserted into a through hole 73a of a ferrule 73 formed with a groove 77 which has a width of 1.5 mm at an angle of 2° with respect to the end face of the ferrule 73, and fixed such that the end face of the GI fiber 78 coincided with a rear end face 73c of the ferrule 73 as in EXAMPLE 9. A groove 80 having a width of 800 μm for dividing the core enlarged fiber 75b is formed, and an optoisolator 72 obtained by integrally assembling the polarizers 72a, 72b and a Faraday rotator 72c is arranged and fixed as in EXAMPLE 9. Thereafter, the magnet 96 made of samarium cobalt, formed with the rectangular recess having sides of about 350 μm so that it can surround the square isolator having sides of 300 μm and having a thickness of 1 mm is arranged. In this way, the fiber stub type optical device S3 is constructed. Similar to EXAMPLE 9, a leading sphere 79 is formed at one end of the core enlarged fiber 75 in order to improve coupling efficiency with a LD.

Further, it may be appreciated to use a moisture resistive resin having a water absorption of 0.1 percent or less, and dispersed with ferromagnetic powder as a material for the magnet 96, and fill the resin including ferromagnetic powder in the space to cover the optoisolator 72, and magnetize the resin in the same magnetic direction as the Faraday rotator of the optoisolator 72. As examples of the resin, there are thermosetting epoxy resin and photo-curing epoxy resin. As examples of the ferromagnetic powder, there are powder of samarium cobalt and powder of barium ferrite. Such magnetic material is added by about 70 weight percent to the resin.

The thus constructed fiber stub type optical device S3a has the same shape as the ferrule 73 at the rear end face 73c, and is connected with a connector (not shown) having a ferrule holding a single-mode fiber for transmission in the middle.

Figure 23:
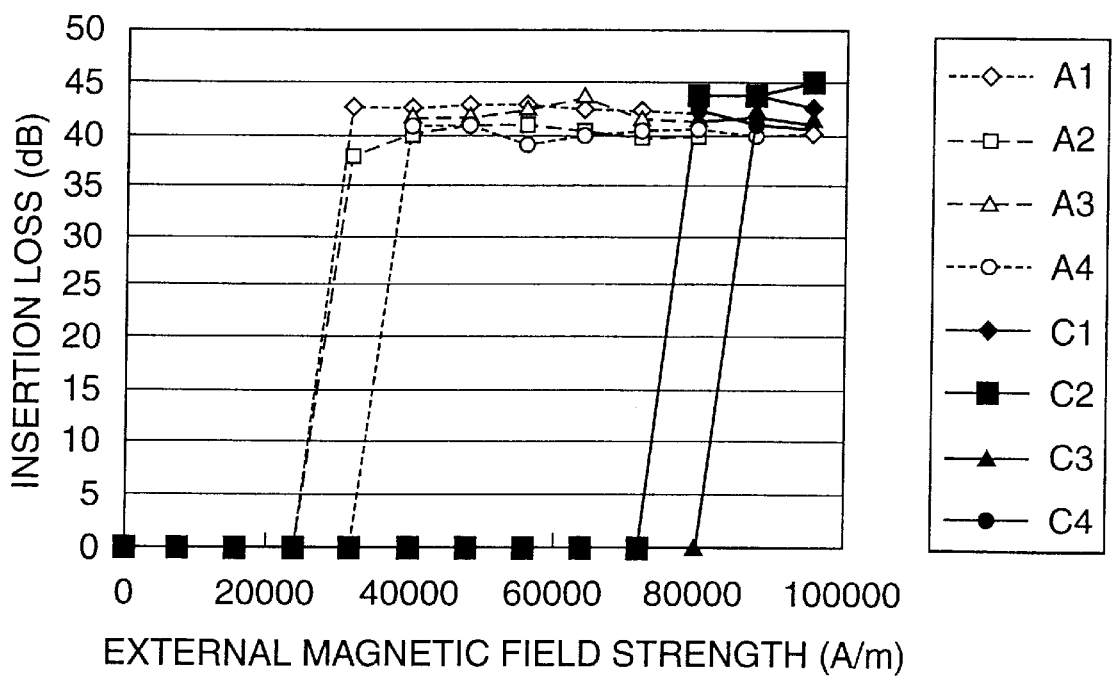
FIG. 23 is a graph showing a deterioration in the isolative characteristic of an optoisolator when a reverse bias magnetic field is applied to the optoisolator.

FIG. 23 shows measurement results of degradation of the characteristic when a reverse bias magnetic field is applied to the optoisolator as in EXAMPLE 9. Specifically, a magnetic field is applied to the Faraday rotator in parallel to a direction of magnetization for 5 to 10 sec. and an insertion loss is measured. Samples A1 to A4 are optoisolators, and C1 to C4 are fiber stub type optical devices having the same construction as EXAMPLE 10 in which a magnet 96 made of samarium cobalt for creating a compensation magnetic field is arranged in an alumina ferrule. Insertion losses of the samples A1 to A4 before the magnetic field is applied are 0.15 dB to 0.2 dB.

After the application of the magnetic field, the insertion losses of the samples A1 to A4 are all degraded substantially before 31600 A/m and increased to 40 dB or larger. This indicates that the Faraday rotation is reversed by the reverse bias. On the other hand, the fiber stub type optical devices using the alumina ferrule and the samarium cobalt magnet experienced no change up to 71100 A/m to 79000 A/m. In other words, a better improvement in durability against the external magnetic field than the fiber stub type optical devices of EXAMPLE 9 is seen.

Although the core enlarged fiber 75 and the GI fiber 78 provided in the through hole 73a of the ferrule 73 are connected in the fiber stub type optical devices having the constructions of EXAMPLES 9 and 10, a single-mode fiber 74 for transmission having a mode field diameter of 10 μm may be fused and connected with the rear end of the GI fiber 78. In other words, in the fiber stub type optical device of FIG. 24, a plurality of optical fibers having different mode field diameters are provided in the through hole 73a, and the optical fiber having a maximum mode field diameter among them is divided by the groove 77.

Figure 24:
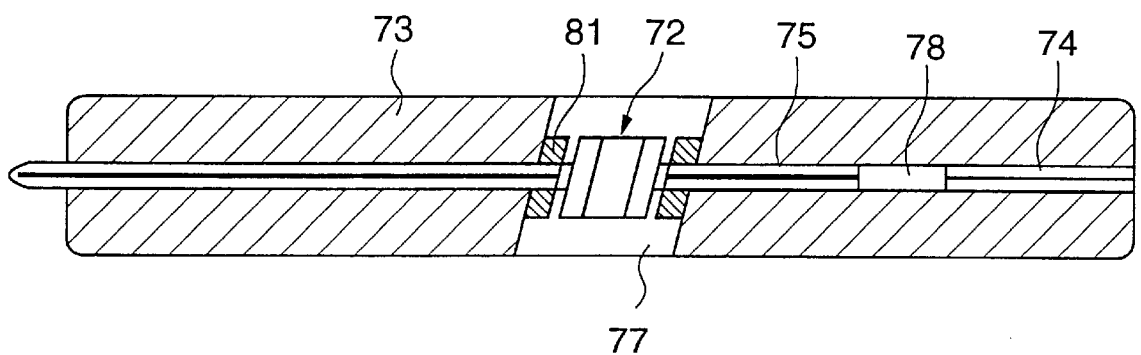
FIG. 24 is a sectional view showing still another fiber stub type optical device according to the third embodiment.

The fiber stub type optical device of FIG. 24 corresponds to the one shown in FIG. 18A which is still at an intermediate stage of the manufacturing process of the fiber stub type optical device. In this case, the ferrule 73 is made of a metal material such as stainless steel, and the protection member 81 provided on the side (circumferential) surface of the core enlarged fiber 75 in the groove 77 may be made of a diamagnetic containing a diamagnetic material. As this diamagnetic, an epoxy resin containing about 55 to 82% by weight of a diamagnetic material such as alumina or silica as filler may be used. Commercially available materials containing diamagnetic materials include ARONCERAMIC D (produced by TOAGOSEI CHEMICAL), EPO-TEK B2021 (Trademark, and produced by EPOXY TECHNOLOGY), EPO-TEK H65-175MP (Trademark, and produced by EPOXY TECHNOLOGY), and CERAMA-BOND (Trademark, and produced by AREMCO PRODUCTS).

The use of the protection member 81 made of a diamagnetic substantially means that at least the outer surface portion of the groove 77 of the ferrule 73 is formed of the diamagnetic. Thus, magnetic lines of flux are unlikely to enter the groove 77 similar to the case where the ferrule 73 is made of a diamagnetic.

EXAMPLE 11

Figure 25:
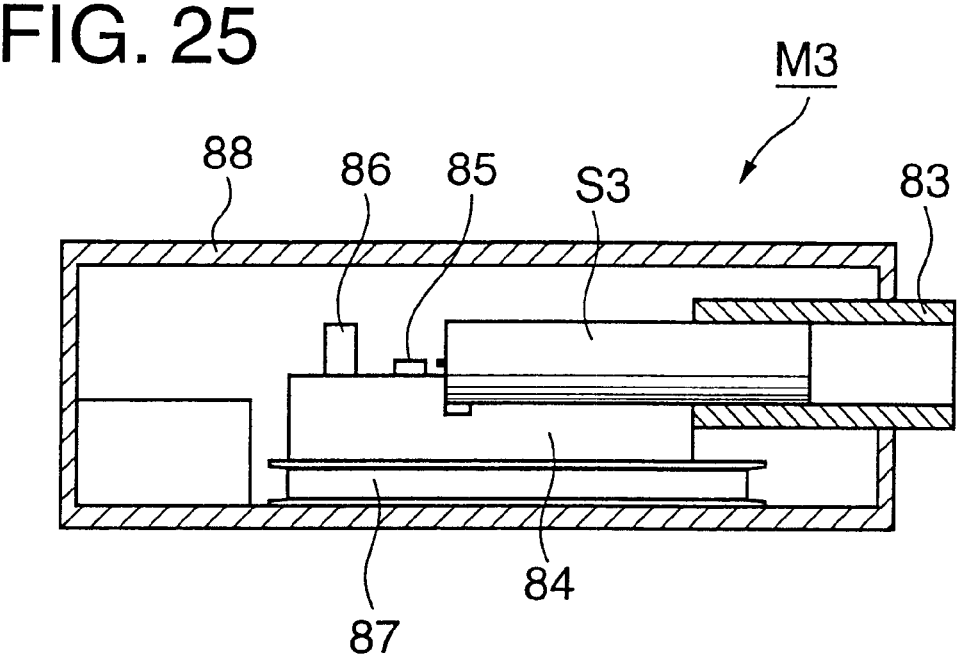
FIG. 25 is a sectional view diagrammatically showing an optical module according to the third embodiment.
Figure 26A:
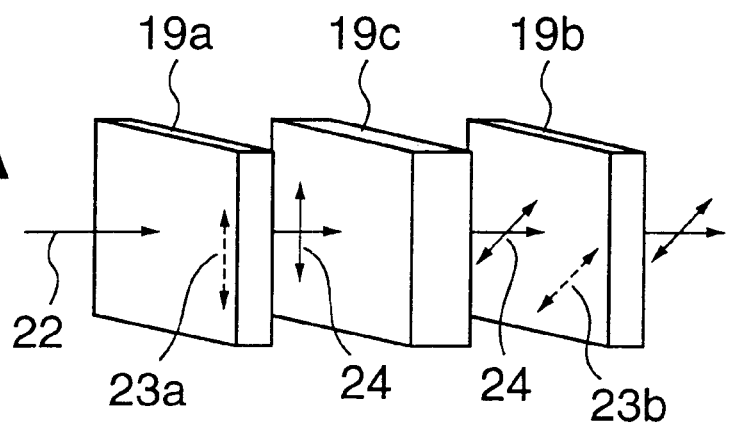
FIGS. 26A and 26B are perspective views diagrammatically showing an operation of an optoisolator.
Figure 26B:
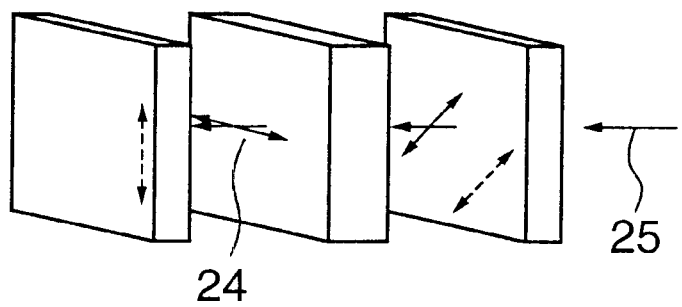

An example of the LD optical module M3 constructed by using the fiber stub type device S3, S3a formed in EXAMPLES 9 and 10 is shown in FIG. 25. Specifically, the fiber stub type optical device S3 (or S3a) having a leading sphere at its end face toward a LD (light emitter) is fixed in a V-shaped groove of a Si platform 84 as a substrate. A LD 85 stably operated while being held at a constant temperature by placing the Si platform 84 on a Peltier cooler 87. A PD (light detector) 86 monitored light emitted from the LD 85 in order to stabilize a luminous intensity. A sleeve 83 is externally fitted to a connector (not shown) for optically coupling it with the fiber stub type optical device. The entire module M3 is airtightly sealed in a package 88.

In the optical module M3 thus constructed, the optical module can be optically adjusted only by aligning the LD 85 and the spherical end fiber with respect to each other. Since the entire optical system is accommodated in the ferrule 73, the LD module which is not only small in size, but also extremely stable against a change in peripheral electromagnetic fields can be provided. Although both the LD 85 and the PD 86 are provided here, an optical module may be constructed by providing either one of them.

The thus constructed fiber stub type optical devices S3, S3a and optical module M3 according to the third embodiment of the invention have following remarkable effects.

(a) In order to fabricate the fiber stub type optical device, it is sufficient to adjust only a connecting portion of the GI fiber and the core enlarged fiber, and the insertion of the optoisolator at a later stage can be performed substantially alignment-free. Further, since the optical coupling system can be assembled before the optoisolator is inserted, the number of operation steps can be significantly reduced.

(b) Degradation of the characteristic during assembling and operation as a device due to unnecessary external magnetic field(s) can be prevented.

(c) Excellent optical modules which are small in size, easy to fabricate, inexpensive and change with time to a small degree can be provided.

(d) Since the optical module can be optically adjusted only by adjusting the positions of the optical device such as a LD and the fiber stub type optical device, optical modules which can be easily assembled can be provided.

As described above, an inventive fiber stub type optical device comprises a ferrule formed with a through hole extending in a longitudinal direction thereof and a groove for dividing the through hole in an intermediate position with respect to the longitudinal direction; a first optical fiber accommodated in the through hole; a second optical fiber aligned with the first optical fiber in the through hole while being divided by the groove and having a larger mode field diameter than the first optical fiber; and an optoisolator provided in the groove and optically connected with the second optical fiber divided by the groove.

By taking the above construction, fiber stub type optical devices which are small in size and easily alignable and in which an optically coupled state of the optoisolator is not changed by an alignment with an optical element.

The second optical fiber may be optically connected with a single-mode fiber for transmission. With such an arrangement, the second optical fiber and the single-mode fiber for transmission can be easily optically connected.

The first optical fiber may be a single-mode fiber, and the second optical fiber may be a core enlarged fiber and optically connected with the first optical fiber via the field diameter converting member for converting a mode field diameter. With this construction, the first and second optical fibers can be easily optically connected via the field diameter converting member.

The field diameter converting member may be a gradient index fiber. Then, the first and second optical fibers can be easily optically connected via the gradient index fiber.

The field diameter converting member may be a ball lens. Then, the first and second optical fibers can be easily optically connected via the ball lens.

The ends of the sections of the second optical fiber divided by the groove are caused to project into the groove and the side surfaces of the projecting ends are covered by the protection members having a higher refractive index than the cladding of the second optical fiber. With this construction, light transmitting through the cladding, i.e., a so-called cladding mode can be eliminated, with the result that a fiber stub type optical device having a stable characteristic can be realized.

The protection members may be covered by the light absorbing member. This effectively prevents the irradiated light from becoming a stray light upon being reflected in an unexpected position when the light leaked into the cladding is irradiated to the outside.

The light absorbing member may be made of moisture resistive resin. Also, the light absorbing member may be defined by a magnet including a moisture resistive resin and ferromagnetic powder dispersed in the resin. These constructions can eliminate an external magnetic field applying means.

The polarization plane rotating portion of the optoisolator may include a Faraday rotator having a property of spontaneous magnetization, and at least the outer surface portion of the groove of the ferrule is formed of a diamagnetic. With this construction, degradation of the characteristic of the optoisolator due to unnecessary external magnetic fields can be effectively prevented during assembling and operation of the fiber stub type optical device.

The polarization plane rotating portion of the optoisolator may include a Faraday rotator having a property of spontaneous magnetization, and the Faraday rotator is surrounded by the magnet. With this construction, durability against external magnetic fields can be easily improved. The magnet may include a moisture resistive resin and ferromagnetic powder dispersed in the resin.

An inventive optical module comprises a substrate, and a fiber stub type optical device provided on the substrate, The optical device comprises a ferrule formed with a through hole extending in a longitudinal direction thereof and a groove for dividing the through hole in an intermediate position with respect to the longitudinal direction; a first optical fiber accommodated in the through hole; a second optical fiber aligned with the first optical fiber in the through hole while being divided by the groove and having the larger mode field diameter than the first optical fiber; and an optoisolator provided in the groove and optically connected with sections of the second optical fiber divided by the groove.

With the above construction, the optical module can be optically adjusted only by adjusting the position of an optical element such as a LD and that of the fiber stub type optical device and, accordingly, can be easily assembled. Further, the optical module which is small in size and inexpensive and whose characteristic does not change with time can be constructed.

In the inventive optical module, ends of sections of the second optical fiber divided by the groove may be caused to project into the groove and the side surfaces of the projecting ends may be covered by the protection members having a higher refractive index than the cladding of the second optical fiber in the fiber stub type optical device. With this construction, light transmitting through the cladding, i.e., a so-called cladding mode can be eliminated, with the result that an optical device having a stable characteristic can be realized.

In the inventive optical module, the polarization plane rotating portion of the optoisolator may include a Faraday rotator having a property of spontaneous magnetization, and at least the outer surface portion of the groove of the ferrule is formed of a diamagnetic in the fiber stub type optical device. With this construction, the irradiated light is effectively prevented from becoming a stray light upon being reflected in an unexpected position when the light leaked into the cladding is irradiated to the outside, with the result that optical devices having excellent characteristics can be realized.

An inventive method for manufacturing a fiber stub type optical device comprises the steps of preparing a ferrule formed with a through hole extending in a longitudinal direction thereof; aligning a first optical fiber and a second optical fiber having a larger mode field diameter than the first optical fiber in the through hole; forming a groove in an intermediate position of the ferrule so as to divide the second optical fiber accommodate in the through hole and cross the through hole; and providing an optoisolator in the groove so as to be optically connected with sections of the second optical fiber divided by the groove.

According to this method, the fiber stub type optical device which is small in size and easily alignable and in which an optically coupled state of the optoisolator does not change due to an alignment with an optical element can be easily manufactured.

Another inventive method for manufacturing a fiber stub type optical device comprises the steps of preparing a ferrule formed with a through hole extending in a longitudinal direction thereof; forming a groove in an intermediate position of the ferrule; aligning a first optical fiber and a second optical fiber having a larger mode field diameter than the first optical fiber in the through hole such that the second optical fiber extends over the groove; dividing the second optical fiber accommodated to extend over the groove; and providing an optoisolator between sections of the second optical fiber divided by the groove.

According to this method, the fiber stub type optical device which is small in size and easily alignable and in which an optically coupled state of the optoisolator does not change due to an alignment with an optical element can be easily manufactured.

In the inventive method, the dividing step may be performed such that the ends of the sections of the second optical fiber divided by the groove are exposed in the groove. According to this method, the side surfaces of the ends of the optical fiber exposed in the groove can be covered by specified protection members.

In the inventive method, the side surfaces of the ends of the divided sections of the second optical fiber exposed in the groove are covered by the protection members having a higher refractive index than the cladding of the second optical fiber. According to this method, the fiber stub type optical device which can eliminate a so-called cladding mode can be easily manufactured.

In the inventive method, there may be further provided the step of covering the protection members by the light absorbing member. According to this method, the irradiated light is effectively prevented from becoming a stray light upon being reflected in an unexpected position when the light leaked into the cladding is irradiated to the outside, with the result that optical devices having excellent characteristics can be realized.

This application is based on patent application Nos. 11-215922, 11-309814, 2000-27387 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A fiber stub type optical device, comprising:
   a ferrule formed with a through hole extending in a longitudinal direction thereof and a groove for dividing the through hole in an intermediate position with respect to the longitudinal direction;
   a first optical fiber accommodated in the through hole;
   a second optical fiber aligned with the first optical fiber in the through hole while being divided by the groove and having a larger mode field diameter than the first optical fiber; and
   an optoisolator provided in the groove and optically connected with the second optical fiber divided by the groove.

2. A fiber stub type optical device according to claim 1, wherein the second optical fiber is optically connected with a single-mode fiber for transmission.

3. A fiber stub type optical device according to claim 1, wherein the first optical fiber is a single-mode fiber, and the second optical fiber is a core enlarged fiber and optically connected with the first optical fiber via a field diameter converting member for converting a mode field diameter.

4. A fiber stub type optical device according to claim 3, wherein the field diameter converting member is a gradient index fiber.

5. A fiber stub type optical device according to claim 3, wherein the field diameter converting member is a ball lens.

6. A fiber stub type optical device, comprising:
   a ferrule formed with a through hole extending in a longitudinal direction thereof and a groove for dividing the through hole in an intermediate position with respect to the longitudinal direction;
   a first optical fiber accommodated in the through hole;
   a second optical fiber aligned with the first optical fiber in the through hole while being divided by the groove and having a larger mode field diameter than the first optical fiber; and,
   an optoisolator provided in the groove and optically connected with the second optical fiber divided by the groove,
   wherein ends of sections of the second optical fiber divided by the groove projects into the groove, and side surfaces of the projecting ends are covered by protection members having a higher refractive index than a cladding of the second optical fiber.

7. A fiber stub type optical device according to claim 6, wherein the protection member is covered by a light absorbing member.

8. A fiber stub type optical device according to claim 7, wherein the light absorbing member is made of moisture resistive resin.

9. A fiber stub type optical device according to claim 7, wherein the light absorbing member is a magnet including a moisture resistive resin and ferromagnetic powder dispersed in the resin.

10. A fiber stub type optical device comprising:
    a ferrule formed with a through hole extending in a longitudinal direction thereof and a groove for dividing the through hole in an intermediate position with respect to the longitudinal direction;
    a first optical fiber accommodated in the through hole;
    a second optical fiber aligned with the first optical fiber in the through hole while being divided by the groove and having a larger mode field diameter than the first optical fiber; and,
    an optoisolator provided in the groove and optically connected with the second optical fiber divided by the groove,
    wherein a polarization plane rotating portion of the optoisolator includes a Faraday rotator having a property of spontaneous magnetization, and at least an outer surface portion of the groove of the ferrule is formed of a diamagnetic.

11. A fiber stub type optical device according to claim 10, wherein a polarization plane rotating portion of the optoisolator includes a Faraday rotator having a property of spontaneous magnetization, and the Faraday rotator is surrounded by a magnet.

12. A fiber stub type optical device according to claim 11, wherein the magnet includes a moisture resistive resin and ferromagnetic powder dispersed in the resin.

13. An optical module, comprising:
    a substrate; and
    a fiber stub type optical device provided on the substrate, the optical device including
    a ferrule formed with a through hole extending in a longitudinal direction thereof and a groove for dividing the through hole in an intermediate position with respect to the longitudinal direction;
    a first optical fiber accommodated in the through hole;
    a second optical fiber aligned with the first optical fiber in the through hole while being divided by the groove and having a larger mode field diameter than the first optical fiber; and
    an optoisolator provided in the groove and optically connected with sections of the second optical fiber divided by the groove.

14. An optical module, comprising:

a substrate; and a fiber stub type optical device provided on the substrate, the optical device including:

a ferrule formed with a through hold extending in a longitudinal direction thereof and a groove for dividing the through hole in an intermediate position with respect to the longitudinal direction:

a first optical fiber accommodated in the through hole;

a second optical fiber aligned with the first optical fiber in the through hole while being divided by the groove and having a larger mode field diameter than the first optical fiber; and, an optoisolator provided in the groove and optically connected with the second optical fiber divided by the groove, wherein ends of sections of the second optical fiber divided by the groove projects into the groove, and side surfaces of the projecting ends are covered by protection members having a higher refractive index than a cladding of the second optical fiber.

15. An optical module according to claim 13, wherein a polarization plane rotating portion of the optoisolator includes a Faraday rotator having a property of spontaneous magnetization, and at least an outer surface portion of the groove of the ferrule is formed of a diamagnetic.

16. A method for manufacturing a fiber stub type optical device, comprising the steps of:

preparing a ferrule formed with a through hole extending in a longitudinal direction thereof;

aligning a first optical fiber and a second optical fiber having a larger mode field diameter than the first optical fiber in the through hole;

forming a groove in an intermediate position of the ferrule so as to divide the second optical fiber accommodate in the through hole and cross the through hole; and providing an optoisolator in the groove so as to be optically connected with sections of the second optical fiber divided by the groove.

17. A method for manufacturing a fiber stub type optical device, comprising the steps of:

preparing a ferrule formed with a through hole extending in a longitudinal direction thereof;

forming a groove in an intermediate position of the ferrule;

aligning a first optical fiber and a second optical fiber having a larger mode field diameter than the first optical fiber in the through hole such that the second optical fiber extends over the groove;

dividing the second optical fiber accommodated to extend over the groove; and providing an optoisolator between sections of the second optical fiber divided by the groove.

18. A method according to claim 14, wherein the dividing step is performed such that ends of sections of the second optical fiber divided by the groove are exposed in the groove.

19. A method according to claim 18, wherein side surfaces of the ends of the divided sections of the second optical fiber exposed in the groove are covered by protection members having a higher refractive index than a cladding of the second optical fiber.

20. A method according to claim 19, further comprising the step of covering the protection members by a light absorbing member.

* * * * *